(12) United States Patent
Winkelstein

(10) Patent No.: US 11,932,385 B2
(45) Date of Patent: *Mar. 19, 2024

(54) VERTICAL TAKEOFF AND LANDING PROPULSION SYSTEM AND AIRCRAFT DESIGN USING FIXED ANGLE DUCTED FANS EMBEDDED INTO AN AERODYNAMIC BODY

(71) Applicant: Samuel Jacob Winkelstein, Oak Hill, VA (US)

(72) Inventor: Samuel Jacob Winkelstein, Oak Hill, VA (US)

(73) Assignee: Spydar Sensors, Inc., Fairfax, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/963,954

(22) Filed: Oct. 11, 2022

(65) Prior Publication Data
US 2023/0150658 A1   May 18, 2023

Related U.S. Application Data

(63) Continuation of application No. 16/932,138, filed on Jul. 17, 2020, now abandoned.

(60) Provisional application No. 62/875,103, filed on Jul. 17, 2019.

(51) Int. Cl.
*B64C 29/00* (2006.01)
*B64C 39/02* (2023.01)
*B64D 27/24* (2006.01)
*B64U 10/25* (2023.01)
*B64U 30/20* (2023.01)
*B64U 50/14* (2023.01)

(52) U.S. Cl.
CPC ........ *B64C 29/0025* (2013.01); *B64C 39/024* (2013.01); *B64D 27/24* (2013.01); *B64U 10/25* (2023.01); *B64U 30/20* (2023.01); *B64U 50/14* (2023.01)

(58) Field of Classification Search
CPC ............ B64C 29/0016; B64C 29/0025; B64C 29/005; B64C 2211/00
See application file for complete search history.

(56) References Cited

U.S. PATENT DOCUMENTS 3,220,669 A * 11/1965 Lewis ................. B64C 29/0083
244/12.3
3,330,502 A * 7/1967 Colville .............. B64C 29/0066
60/233

(Continued)

*Primary Examiner* — Richard Green
*Assistant Examiner* — Arfan Y. Sinaki
(74) *Attorney, Agent, or Firm* — Attentive Law Group, PLLC; Paul Ratcliffe

(57) ABSTRACT

The present invention provides an aircraft design which incorporates a modular design including the use of one or more multi-motor assemblies where the motors are in series within the multi-motor assembly. Still further, the multi-motor assemblies may be configured to include modular motor assemblies or modular sections. Ultimately, the present invention provides an aircraft with the ability to easily assemble or expand the multi-motor assemblies and, in doing so, modify the characteristics of the aircraft. The modularity also enhances the ability to maintain the aircraft by enabling motors or the units housing each motor to easily be replaced.

12 Claims, 26 Drawing Sheets

(56) References Cited

U.S. PATENT DOCUMENTS

| | | | | |
|---|---|---|---|---|
| 3,373,566 A | * | 3/1968 | Colville | ............. B64C 29/0058 |
| | | | | 60/263 |
| 10,513,333 B2 | * | 12/2019 | Johnson | ............. B64C 29/0033 |
| 2004/0245374 A1 | * | 12/2004 | Morgan | ............. B64C 29/0025 |
| | | | | 244/12.3 |

* cited by examiner

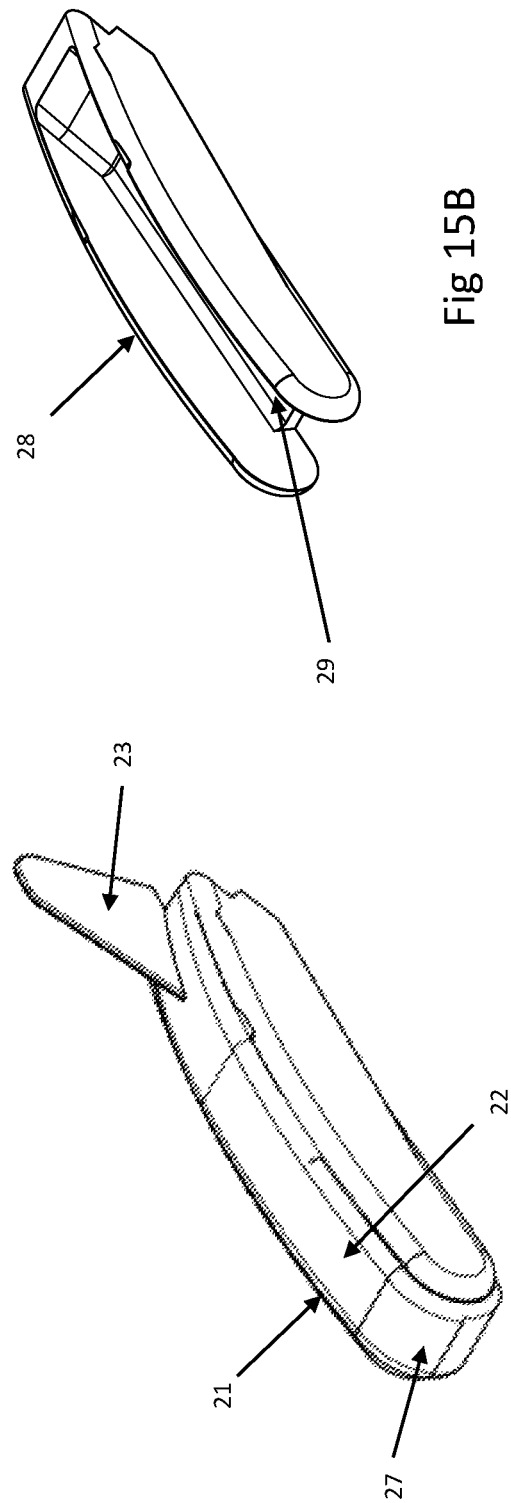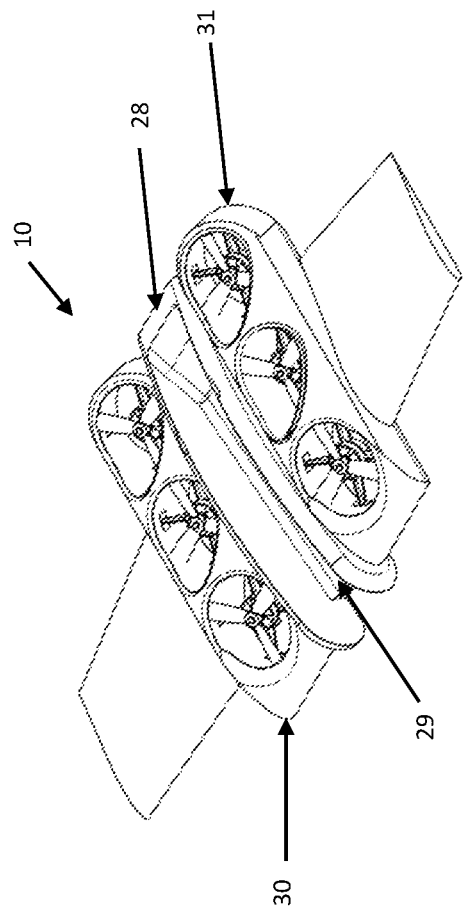

ND LANDING
VERTICAL TAKEOFF AND LANDING PROPULSION SYSTEM AND AIRCRAFT DESIGN USING FIXED ANGLE DUCTED FANS EMBEDDED INTO AN AERODYNAMIC BODY

RELATED APPLICATION

This application is a continuation of U.S. patent application Ser. No. 16/932,138 filed Jul. 17, 2020 which claims the benefit of and priority to U.S. Provisional Patent Application 62/875,103, filed on Jul. 17, 2019, entitled "A Vertical Takeoff and Landing Propulsion System and Aircraft Design using Fixed Angle Ducted Fans Embedded into an Aerodynamic Body", the entirety of both of which are incorporated herein.

FIELD OF THE INVENTION

The present invention relates generally to aircraft or flying vehicles and, in particular, to a vertical takeoff and landing aircraft.

BACKGROUND OF THE INVENTION

Vertical Takeoff and Landing (VTOL) aircraft are becoming more prevalent thanks to the innovation and cost reduction of electronic motors, microcontrollers, and the advancement of VTOL control systems. New markets are emerging for a new type of small unmanned aircraft systems (SUAS), as well as personal small aircraft for missions and use cases in urban, or populated areas. The stabilization and adaptation of the multirotor has allowed for new industries such as package delivery by SUAS and the future air taxi industry. One major obstacle of all aircraft described above is safety and complexity. Safety is a major concern as large exposed propeller blades can inflict harm to nearby objects when spinning close to the ground. Wingless multirotor aircraft also have no way to recover or land safely when near the ground. Many systems have attempted to combat the safety concerns of open propellers, using ducted or shrouded propellers or embedding ducted fans with the thrust direction in the vertical downward direction into the body of the aircraft. This solves the safety problem in static conditions, however unique problems are exhibited with aircraft using this system. There is a stall characteristic in entering cruise velocity for forward flight at the front lip of the duct. This is mainly caused because air does not like to change direction quickly. The reason for this is a difference in air speed over parts of the fan in different locations of the duct. This causes unwanted torques, oscillations, and even structural failure in several attempted "fan in wing" and ducted fan designs. Another issue with fan in wing designs are stall and pitch-up moments caused by the Bernoulli's effect and unsteady air flow over the back of the wing. In addition, the assembly, maintenance and replacement of aircraft components are difficult. Further, as payloads or itineraries change, aircraft need different performance characteristics not easily modified with set motors.

Therefore, what is needed is an aircraft and aircraft design which has improved flight characteristics for multi-motor fan in housing designs with improved assembly, maintenance, replacement, and modifiable performance characteristics.

SUMMARY OF THE INVENTION

The present invention over comes the limitations of known aircrafts and systems by providing an aircraft design which incorporates a modular design including the use of one or more multi-motor assemblies where the motors are in series within the multi-motor assembly. Still further, the multi-motor assemblies may be configured to include modular motor assemblies ("MMA" or "MMAs") or modular sections. Ultimately, the present invention provides an aircraft with the ability to easily assemble or expand the multi-motor assemblies and, in doing so, modify the characteristics of the aircraft. The modularity also enhances the ability to maintain the aircraft by enabling motors or the units housing each motor to easily be replaced.

The multi-motor assemblies are designed by embedding a ducted fan or shrouded propeller into a body such as a wing, fuselage or nacelle at a fixed angle from 30-50 degrees and sloping the forward lip of the front duct has shown to decrease or even eliminate these adverse effects. Better flight characteristics can be achieved by eliminating the trailing tail surface behind the duct, allowing the aircraft to achieve a low drag, stable forward flight using wings or a lifting body to generate lift.

The present invention provides a multi-motor propulsion engine for an aircraft, comprising: an enclosure having a longitudinal axis oriented in a direction of travel of an aircraft, the enclosure including a front section having an aerodynamic nose, a rear section having a reduced rear body duct section, a left side wall, and a right side wall; a plurality of ducts arranged along the longitudinal axis of the enclosure, where each of the ducts is aligned in the enclosure with a central axis at forward angle relative to the longitudinal axis; and a plurality of fans with each fan fixed in one of the plurality of ducts, where the plurality of fans are configured to generate airflow along the respective central axis of each duct from the top end of the duct to the bottom end of each duct to provide lift and thrust to the aircraft. The reduced rear body duct section has a rear duct rear wall and a rear duct front wall and the rear duct rear wall is shorter than the rear duct front wall and a bottom portion of the rear duct rear wall is located vertically higher than a bottom portion of the rear duct front wall. In addition, the front duct has a front duct front wall and a front duct rear wall wherein the front duct front wall is shorter than the front duct rear wall and a top portion of the front duct front wall is located vertically lower than a top portion of the front duct rear wall. The front section of the housing has an aerodynamic nose which is fixed or attached to the front duct front wall. In a preferred embodiment, the duct is, or each fan is fixed in the duct, at forward angle in a range of 20°-70° from the longitudinal axis.

The present invention also provides a multi-motor propulsion engine for an aircraft, comprising: an enclosure having a longitudinal axis oriented in a direction of travel of an aircraft, the enclosure including a front section having an aerodynamic nose, a rear section having a reduced rear body duct section, a left side wall, and a right side wall; a plurality of ducts arranged along the longitudinal axis of the enclosure, where each of the ducts is aligned in the enclosure with a central axis at forward angle relative to the longitudinal axis; a plurality of fans with each fan fixed in one of the plurality of ducts, where the plurality of fans are configured to generate airflow along the respective central axis of each duct from the top end of the duct to the bottom end of each duct to provide lift and thrust to the aircraft; where the reduced rear body duct section has a rear duct rear wall and a rear duct front wall and the rear duct rear wall is shorter than the rear duct front wall and a bottom portion of the rear duct rear wall is located vertically higher than a bottom portion of the rear duct front wall; where the front duct has a front duct front wall and a front duct rear wall where the front duct front wall is shorter than the front duct rear wall and a top portion of the front duct front wall is located vertically lower than a top portion of the front duct rear wall; and where the front section of the housing having an aerodynamic nose is fixed to the front duct front wall. In a preferred embodiment, the duct is, or each fan is fixed in the duct, at forward angle in a range of 20°-70° from the longitudinal axis.

In addition, the present invention provides an aircraft comprising: a fuselage having a first longitudinal axis along a direction of travel of the aircraft, the fuselage having a left side and a right side and a left wing on the left side and a right wing on the right side; first and second multi-motor propulsion engines operably attached to the aircraft with the first multi-motor propulsion engine attached to the left side and the second multi-motor propulsion engine attached to the right side; the first and second multi-motor propulsion engines having an enclosure having a longitudinal axis oriented in a direction of travel of an aircraft, the enclosure including a front section having an aerodynamic nose, a rear section having a reduced rear body duct section, a left side wall, and a right side wall; a plurality of ducts arranged along the longitudinal axis of the enclosure, where each of the ducts is aligned in the enclosure with a central axis at forward angle relative to the longitudinal axis; and a fan disposed in each of the plurality of ducts, wherein each fan is configured to generate airflow along the respective central axis of each duct from the top end of the duct to the bottom end of each duct to provide lift and thrust to the aircraft. The first multi-motor propulsion engine may be connected to the left side and the second multi-motor propulsion engine may be connected to the right side of the fuselage. Alternatively, the first multi-motor propulsion engine may be connected to the left wing and the second multi-motor propulsion engine may be connected to the right wing. Further, the first multi-motor propulsion engine may be connected to the left wing over the left wing and the second multi-motor propulsion engine may be connected to the right wing over the right wing. Alternatively, the first multi-motor propulsion engine may be connected to the left wing under the left wing and the second multi-motor propulsion engine may be connected to the right wing under the right wing. Still further, the first multi-motor propulsion engine may be connected to the left wing along a left wingspan of the left wing and the second multi-motor propulsion engine may be connected to the right wing along a right wingspan of the right wing which may be an integral configuration, an over wing configuration, or an under wing configuration.

BRIEF DESCRIPTION OF THE DRAWINGS

The present invention can be more fully understood by reading the following detailed description together with the accompanying drawings, in which like reference indicators are used to designate like elements, and in which:

FIG. 15A depicts a perspective view of the fuselage of the aircraft of the present invention;

FIG. 15B depicts a perspective view of the fuselage base of the aircraft of the present invention;

FIG. 15C depicts a perspective view of the aircraft without the fuselage canopy of the present invention;

DETAILED DESCRIPTION

Hereinafter, aspects of the design, associated systems, and methods of making, assembly, or use are described in accordance with various embodiments of the invention. As used herein, any term in the singular may be interpreted to be in the plural, and alternatively, any term in the plural may be interpreted to be in the singular. It is appreciated that features of one embodiment as described herein may be used in conjunction with other embodiments. The present invention can be more fully understood by reading the following detailed description together with the accompanying drawings, in which like reference indicators are used to designate like elements.

Figure 1:
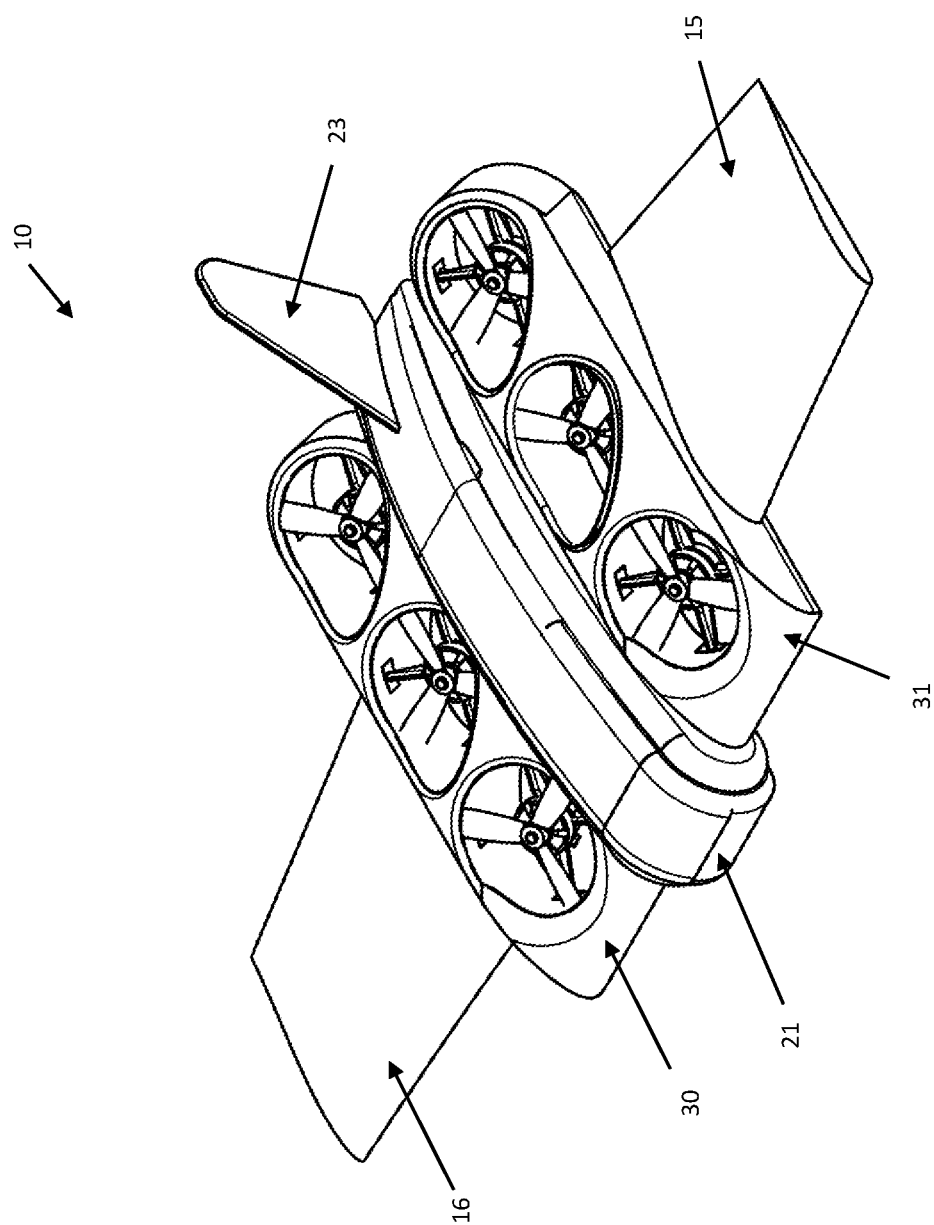
FIG. 1 provides a perspective view of a first embodiment of the aircraft of the present invention.

FIG. 1 shows an overview of the assembled multi-motor aircraft of the present invention. The assembled aircraft 10 has a center fuselage 21 with a vertical stabilizer 23, one or more multi-motor assemblies 30, 31, and a left and right wing 15, 16. The multi-motor assemblies 30, 31 may be referred to as MMAs.

Figure 2:
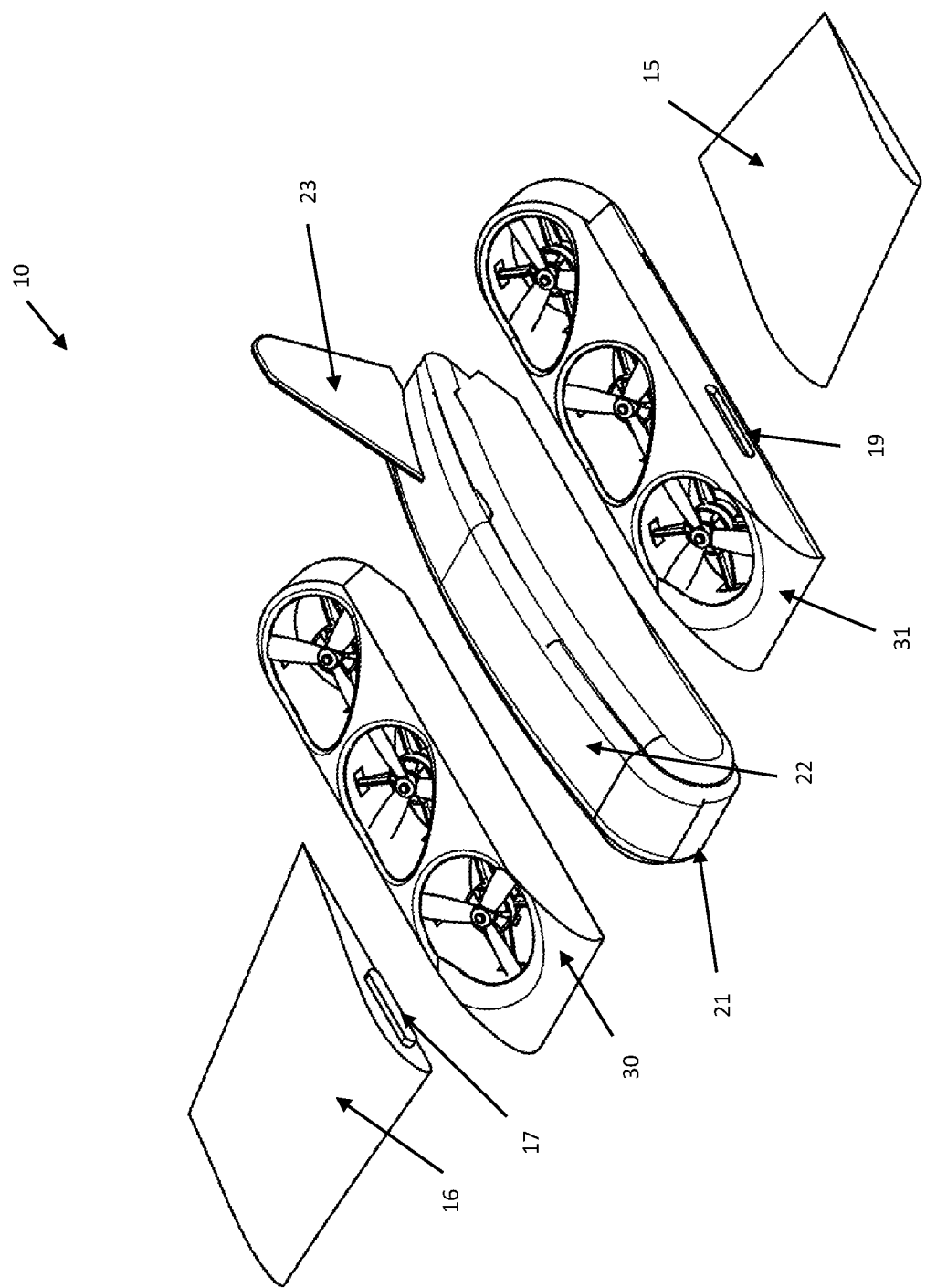
FIG. 2 depicts a perspective exploded view of the first embodiment of the aircraft of the present invention.

As seen in FIG. 2, the aircraft 10 is configured to be modular in form with the fuselage 21, multi-motor assemblies 30, 31, and wings 15, 16 designed and constructed for alignment and connection to each corresponding part. The wings 15, 16 have alignment keys 17 or indicia for mating with the corresponding alignment element in MMAs 30,31 in a manner to provide proper alignment. The alignment keys 17, 19 may also provide mechanical fastening aspects or the wings 15, 16 may be fastened to the MMS 30, 31 by one or more secondary fastening elements including mechanical or chemical (i.e. epoxy). The MMAs 30, 31 are them designed to fasten to the fuselage 21. Although not shown, the MMAs 30, 31 may have additional indicia or alignment keys which mate with corresponding alignment keys on the fuselage 21. Alternatively, the aircraft 10 may be formed as one integrated housing. As will be described in more detail below, the fuselage 21 has a canopy 22 which encloses a payload compartment.

Figure 3:
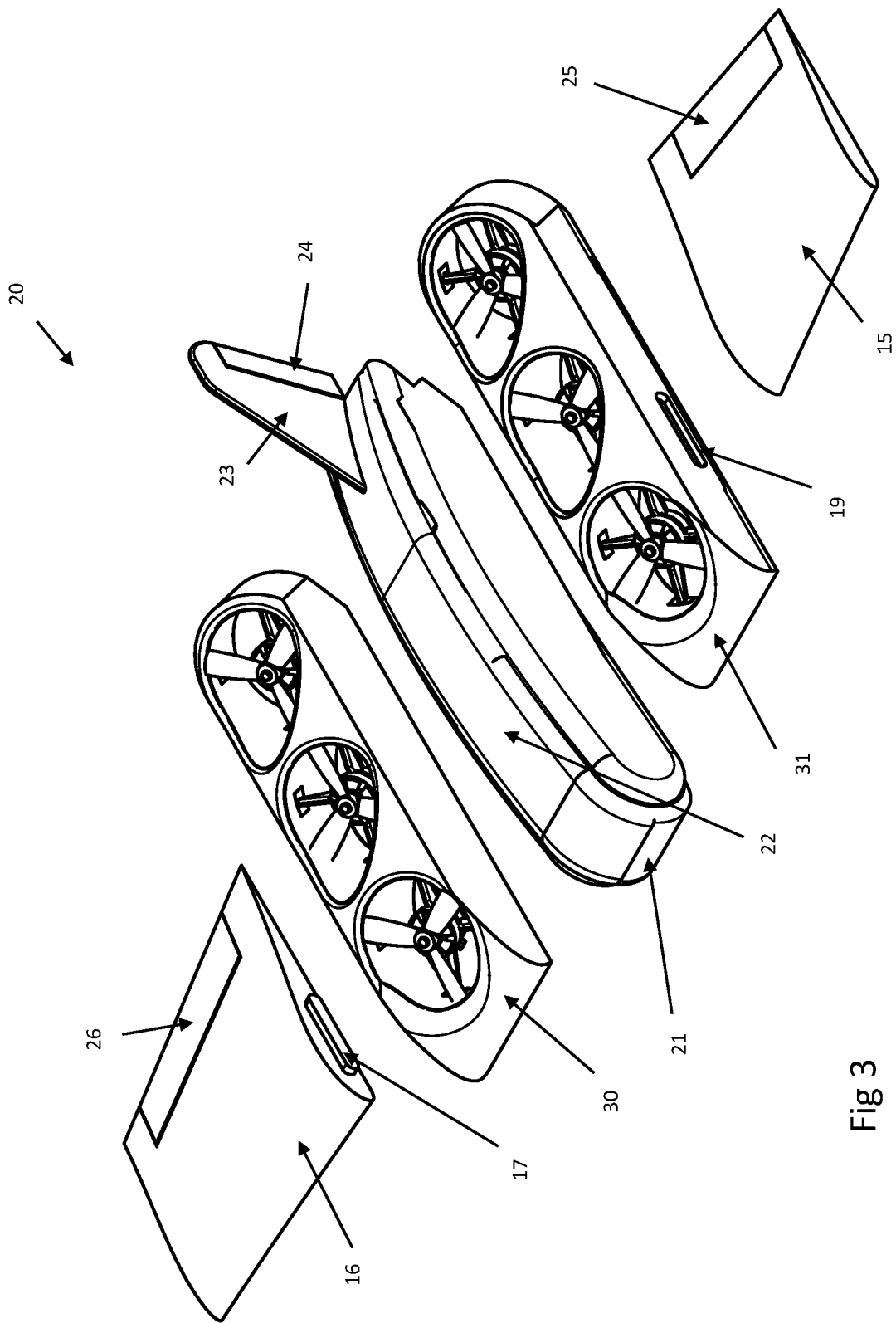
FIG. 3 depicts a perspective exploded view of a second embodiment of the aircraft of the present invention.

As seen in FIG. 3, a second embodiment 20 may include control surfaces to allow for advanced control of the aircraft 20. Such controls can include a rudder 24, a left elevon 25 and a right elevon 26.

The Aircraft system 10 is constructed by creating an aerodynamic body large enough to encompass one or more MMAs 30, 31. As seen in FIGS. 4-6B, the MMAs 30, 31 comprise a series of propellers, motors, or engines assemblies (hereinafter referred to as "motors" or "prop-motors") 41, 43, 45 which are located within cylindrical openings within the housing 32 also act as the intake openings 51, 53, 55. The motor assemblies 41, 43, 45 are fixed with an angle pitched forward between 30 degrees to 70 degrees from the horizontal and are embedded into the aerodynamic body or MMA housing 32 along the axis of travel. The cylinder intakes 51, 53, 55 intersect the outer surface of the body 32 on the top and the cylinder exhausts 61, 63, 65 intersect with the housing 32 on the bottom wall 35. The intersecting area is then trimmed away revealing ducts or profiles 52, 54, 56 in which prop-motors 41, 43, 45 can be placed and secured using a mounting structure aligned with the axis of the cylinders or openings 51, 53, 55 to provide ducted fans.

The MMA design can consist of one of more of these motor bodies with the ducted fans as described above. One or motor bodies may be offset along the axis pointing forward or longitudinal axis known as the "x axis". The one or more motor bodies may be individually offset from the axis pointing to the right hereafter known as the "y axis". In an exemplary embodiment, the MMAs are mirrored along a center plane made up of the x axis and the Vertical axis or z axis. The MMAs can then merged into the housing, embedded, or attached to a fuselage or cargo pod, wings, a lifting body or any other structure making up the aircraft 10.

Figure 4:
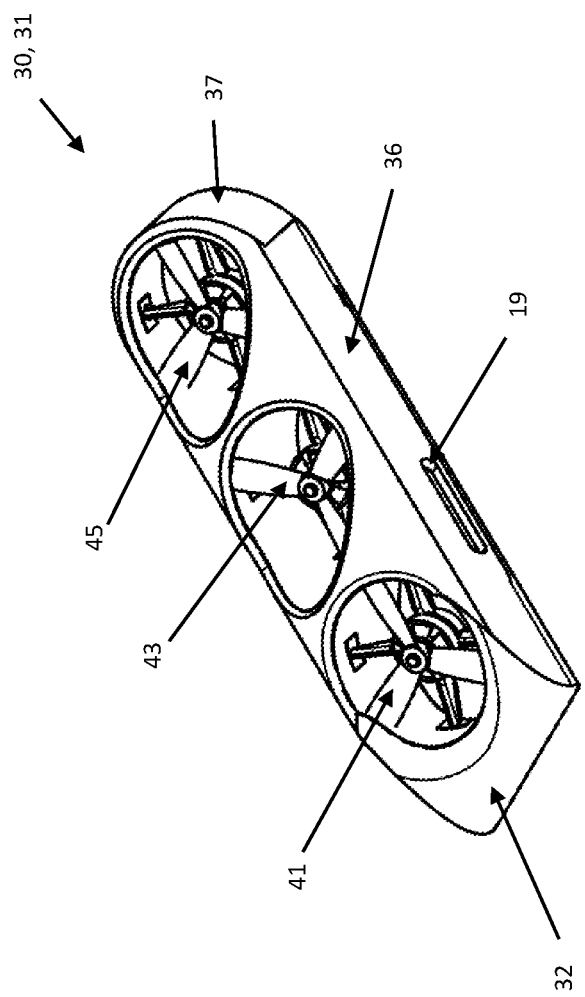
FIG. 4 depicts a perspective view of a first embodiment of a multi-motor assembly of the present invention.
Figure 5:
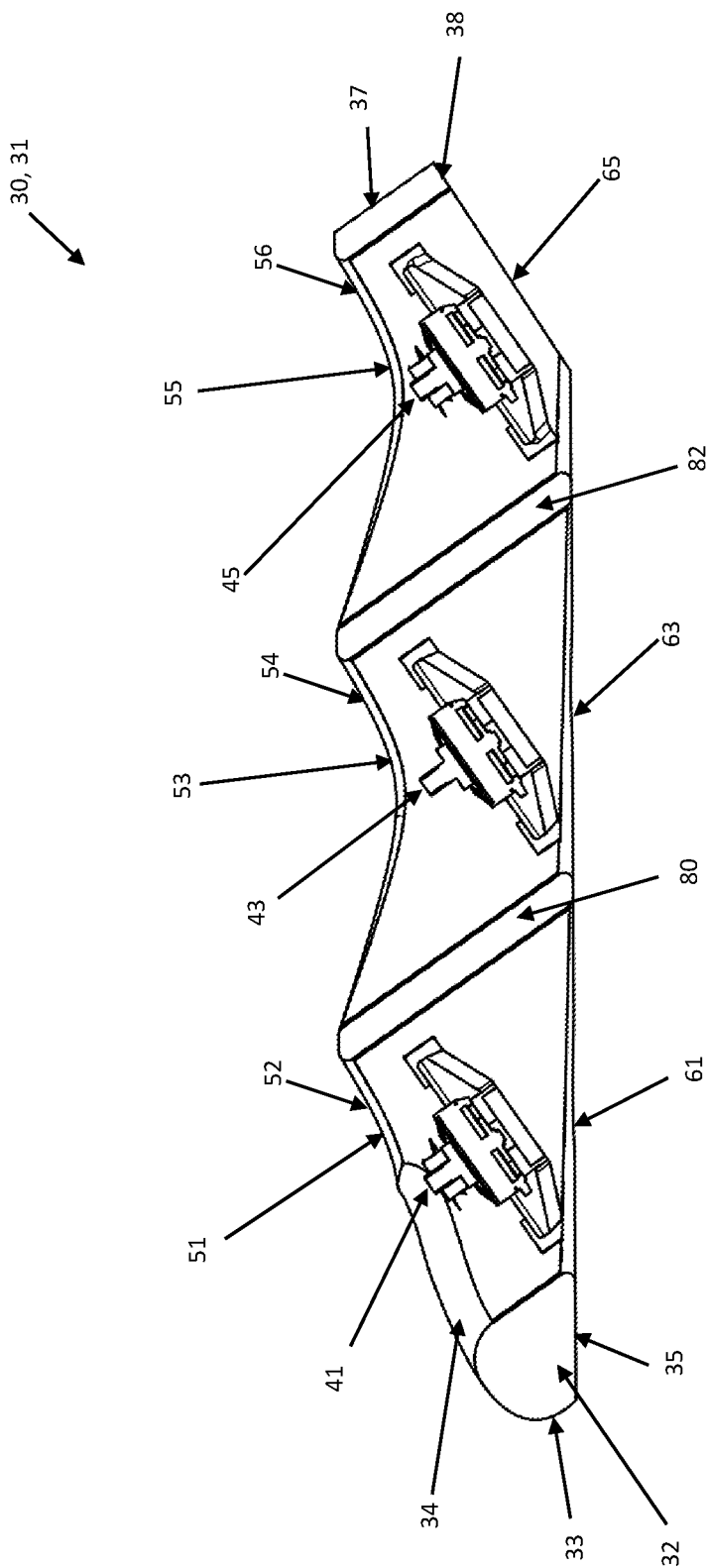
FIG. 5 is a cross sectional side view of the multi-motor assembly of the present invention.

As further seen in FIGS. 4-5, the MMAs include a housing 32. The housing includes a front nose portion 33, a fileted edge portion 34, a bottom wall 35, a right side wall 36, a left side wall 936, a rear wall 37, and a rear section bottom portion 38. In operation, the motors 41, 43, are contained in openings 51, 53, 55 of the housing 32. The openings 51, 53, 55 each has a corresponding opening profile 52, 54, 56 designed to match the housing 32 and cylindrical openings 51, 53, 55. These opening profiles 52, 54, 56 can be modified to change the intake profiles and to alter the aerodynamic aspects of the MMA housing 32.

Creation of the Duct Housing Aerodynamic Body in the Basic Design:

The Aerodynamic body or MMA housing 32 is designed to have a minimal forward profile through design of the nose 33, fileted edge 34, and bottom wall 35. In an exemplary embodiment, the housing 32 design is offset from a profile of the angled ducts intersecting the front plane with the profile of the ducted fans. This ensures that the blades of the fan or motor 41, 43, 45 are fully embedded into the housing 32 structure and there our no losses in performance from the blades of the ducted fans being different distances or not contained in the duct.

The MMA housing 32 is designed to counter negative effects of unwanted moment forces caused by the Bernoulli effect, wind turbulence, unwanted velocity differential of air speed between the top and bottom of the housing 32 including airflow interreference between the motors 41, 43, 45 in series and issues related to the front duct in the series pulling air into it (and the impact that has on available air to the later motors in series). Likewise, the design of housing 32 helps to offset the opposite differential caused by the last motor 45 and duct in the series under the trailing part of a laminar airfoil. The opposite differential may cause a pitch up scenario that can be extremely hard to overcome or control in combination with a desired center of gravity for optimum efficiency in hover and forward flight.

Therefore, in an exemplary embodiment, the most common configuration of the duct housing 32 aerodynamic body the following description can be used to build this body. The front side profile of the housing 32 can be defined by a spline 33 often in the shape of a traditional front of an airfoil, or at minimum a curved or organic spline tapering toward the lower front end of the profile. The spline 33 may be curved or fileted to ensure there is no sharp creased edge on the front most part of the body 32. The second most important modification to body or housing 32 is to the tail end 38. To counter the adverse effect in the basic design of the duct housing body 32, the terminal edge 38 is typically offset directly from the back half of the final duct 45, 55, 65 in the series. The terminal wall 37 of the housing typically has a length as long as the height of the motor (fan and stator assembly). Although the terminal edge 38 could be rounded in the design it is generally a straight edge. The center portion of the housing body 32 should have a profile thick enough to completely house all of the motors 41, 43, 45 in the row.

As a general design guideline for the profile of the housing body 32, a straight line or organic spline is connected to the front spline 33 of the body as described above and continues on top to the terminal edge wall 38. The lower profile 35 of the housing 32 is a spine connected to the bottom front of the spline 33 and follows an organic path, or a straight line or series of connected lines finally connecting to the terminal edge 38 of the body. As seen in FIG. 5, the lower profile 35 angles up along the profile of the exhaust of the rear motor 45.

The aerodynamic profile of the MMA housing 32 forms a closed area fully containing the profile of all fan blades, stators, and motors 41, 43, 45 that make up the series of ducts at the desired fixed angles. The housing 32 can be constructed in using other shapes then described above such as a complete airfoil profile, or any other form as long as the motors 41, 43, 45 and ducts are fully embedded into the body. The point of intersection between the duct walls 80, 82 and housing body 32 is often rounded or created with an intake profile 52, 54, 56 to prevent a sharp angle for air entering the next in the series. In an exemplary embodiment, the front duct opening 51 for the first motor 41 is generally more exposed to the airstream then all other duct openings 53, 55 in the series. The ducts 53, 55 later in the series benefit from the air turning by the front duct 51 and therefore do not need the same exposure to the forward airstream.
Creation of the Ducted Fans in the Basic Design:

The ducted fans or prop-motors 41, 43, 45 consist of three main elements in the basic design, the fan or propeller blades, a motor or driveshaft, and a stator. For clarity, a duct 42, 44, 46 is the channel created in the housing 32 for each motor 41, 43, 45 which starts at the intake 51, 53, 55 of each duct and terminates at the exhaust 61, 63, 65. Each duct in the housing is separated by walls 80, 82 to form separated ducts for each motor 41, 43, 45. A duct is at least tall enough to contain the prop-motors 41, 43, 45 however the wall of the duct is often extended beyond that point along the axis of fan rotation. The housing 32 right side wall 36, left side wall 936 and separation walls 80, 82 must be expanded at minimum such that the volume of the angle duct fully intersects the volume of the aerodynamic duct housing 32 body described in the paragraph above. The walls of the duct are then trimmed using the complex curve created by the intersection, such the angled duct walls are flush with the aerodynamic duct housing 32 body. In the exemplary embodiment, the ducts in a body have the same pitch angle or profile 54, 56. As previously describer, the first duct housing the first motor 51 may have a different profile 52 including the possible use of a fileted edge 34 adjacent to the nose 33.

Figure 6A:
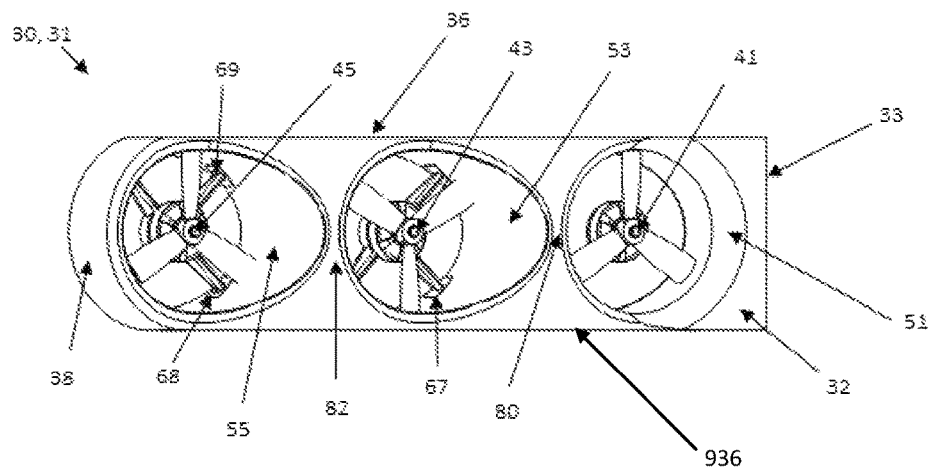
FIG. 6A depicts a top view of the multi-motor assembly of the present invention.
Figure 6B:
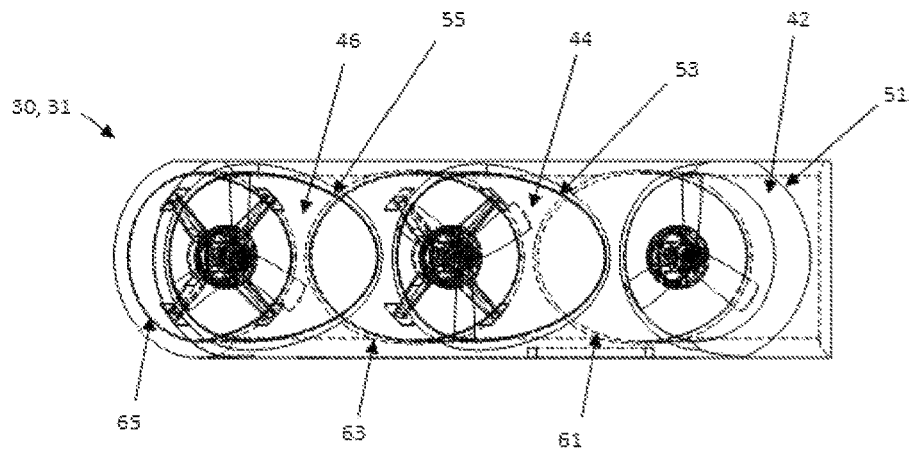
FIG. 6B depicts a top schematic view of the multi-motor assembly of the present invention.

As seen in FIGS. 6A and 6B, the housing 32 houses a series of prop-motors 41, 43, 45 to those found in a conventional ducted fan. In the center of the ducts there are one or more motor mounts 67, 68, 69 constructed and in the basic version a brushless DC motor attached to that mount via screws or some other attachment method. Attached to the motor is a fan consisting of several blades. The blades may be fixed pitch or variable pitch. The tips of the blade are separated from the duct walls by the thin gap, ideally as close to the duct wall without touching. The duct wall can either be flush and continuous with the wall 80, 82 of the aerodynamic body 32. However, the inner surface of the duct wall can be offset inward with the outer wall flush with the acronymic body.

Figure 7B:
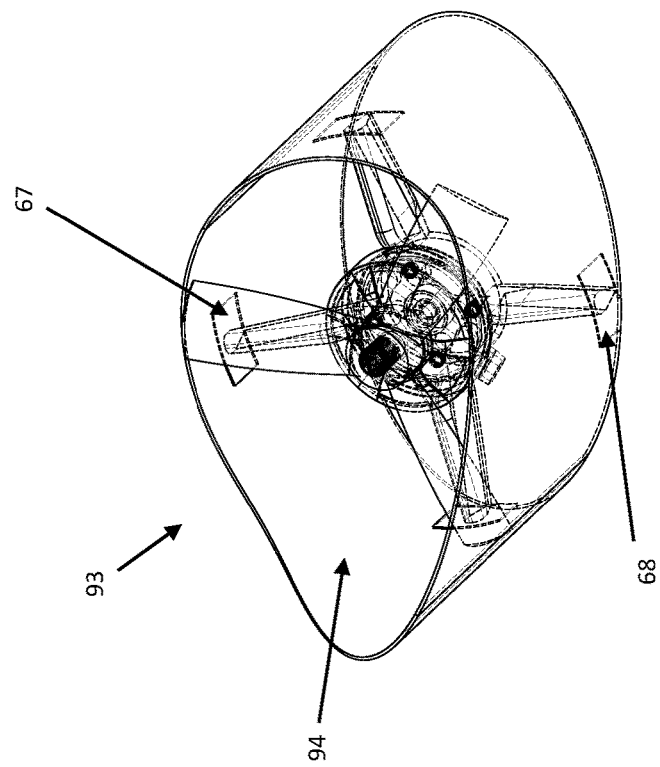
FIG. 7B depicts a perspective schematic view of a first embodiment of a motor insert of the present invention.
Figure 7A:
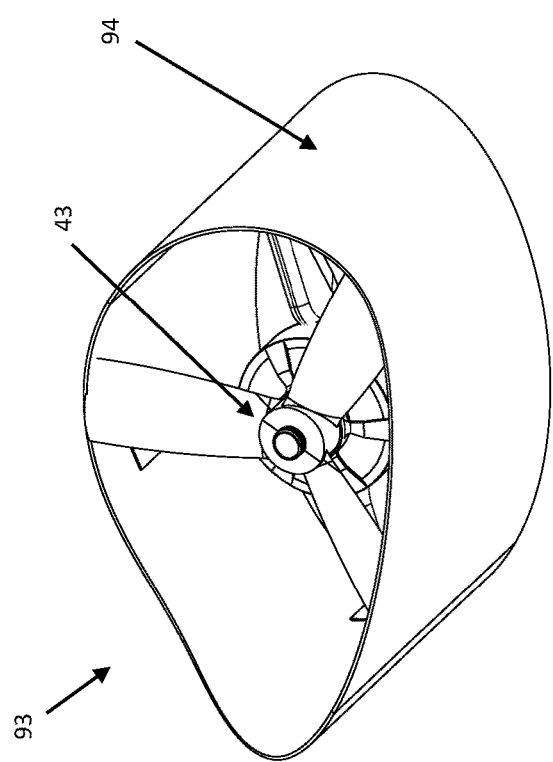
FIG. 7A depicts a perspective view of a first embodiment of a motor insert of the present invention.
Figure 8:
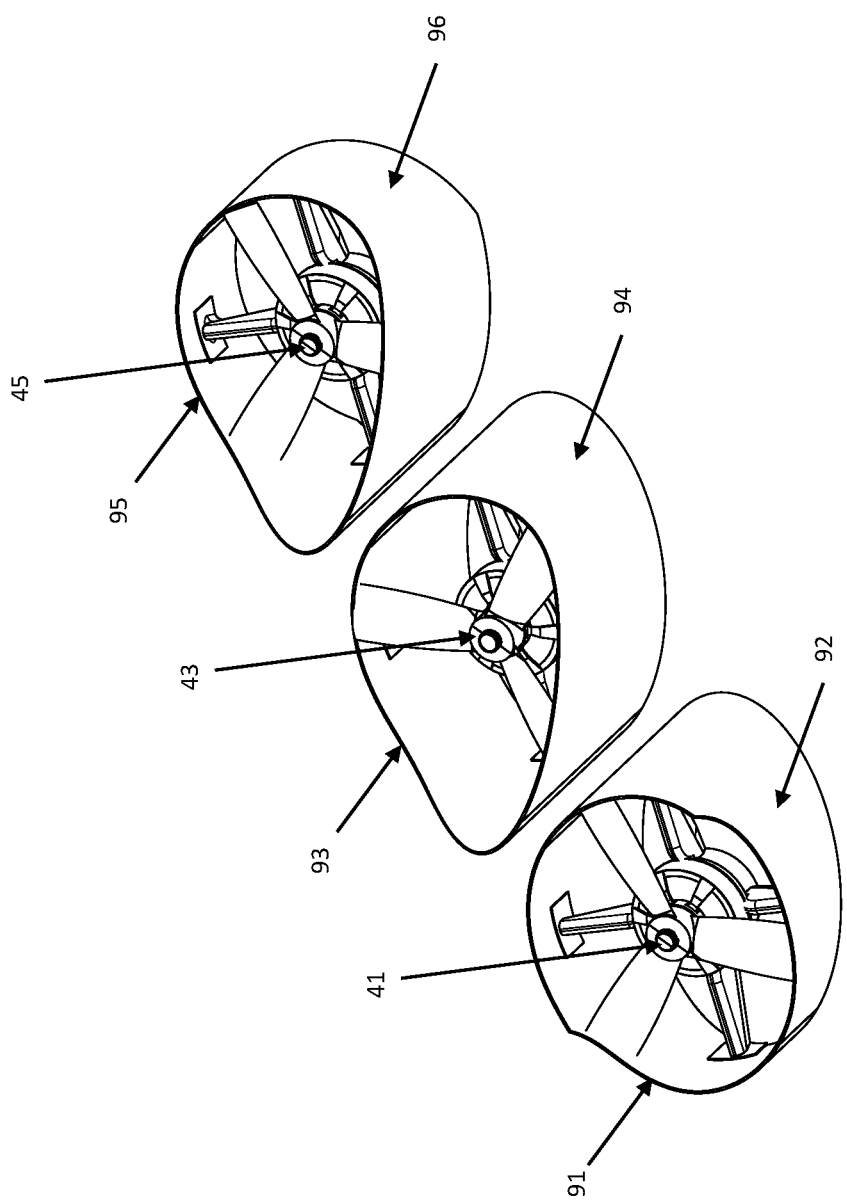
FIG. 8 depicts a perspective view of three motor inserts for the multi-motor assembly of the present invention.
Figure 9:
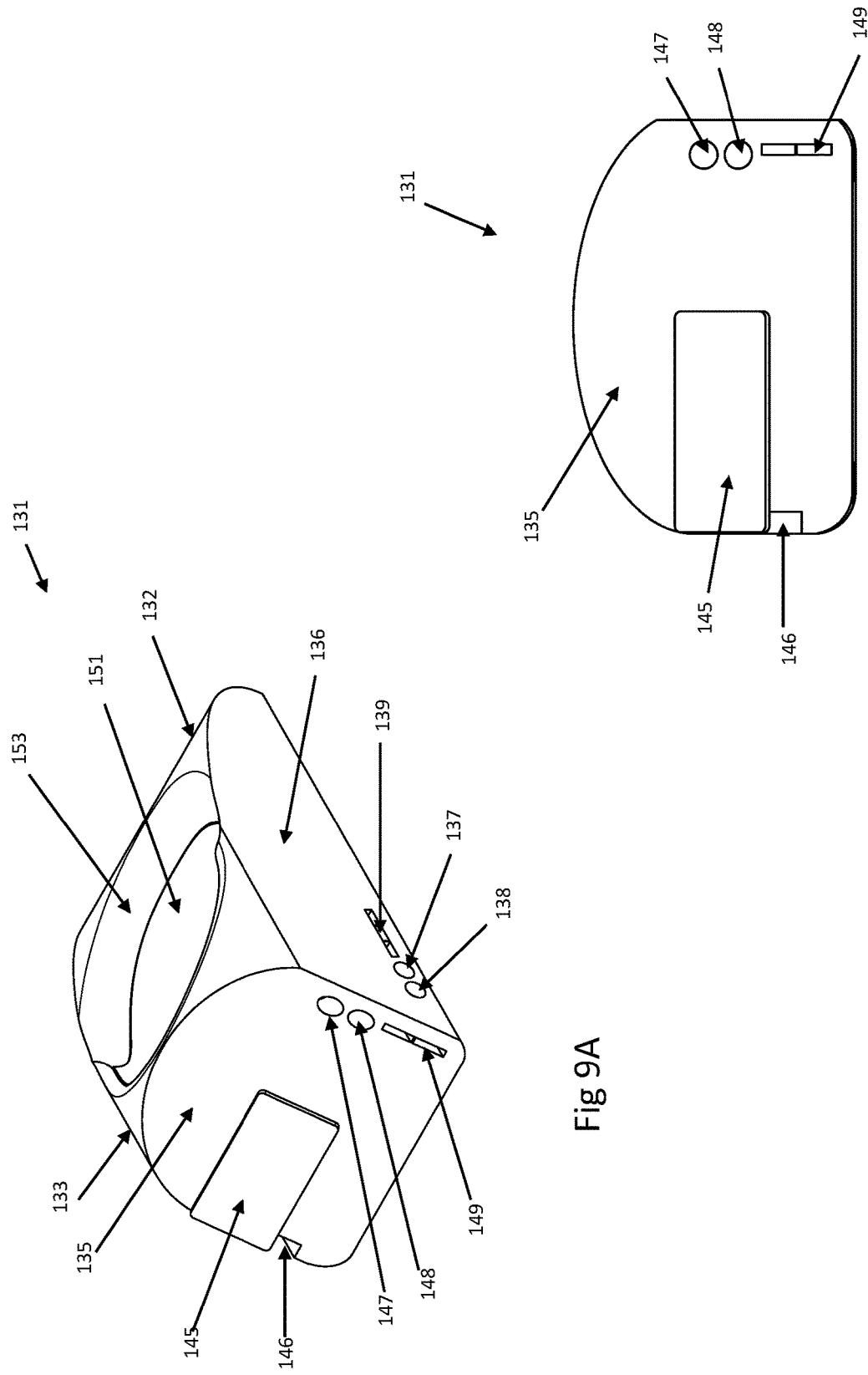
FIG. 9A depicts a perspective view of a front modular housing for a front motor of the multi-motor assembly insert of the present invention.
FIG. 9B depicts a rear view of a front modular housing for a front motor of the multi-motor assembly insert of the present invention.

The design of the present invention is also configured to provide modularity of important assemblies and parts of the overall aircraft 10. As seen in Figure, the aircraft has various assemblies or parts including the wings 14, 16, the MMAs 30, 31, and the fuselage 21. However, the MMAs 30, 31 can also be modular in form with each prop-motor 41, 43, 45 formed as a modular assembly. As seen in FIGS. 7A, 7B, and 8, the prop-motors 41, 43, 45 can be manufactured and assembled as a motor insert 91, 93, 95 which has the motor 41, 43, 45 mounted or connected to the motor mounts 67, 68 inside of an outer case or housing 92, 94, 96. This allows the motor inserts 91, 93, 95 to easily be placed in the ducts 42, 44, 46 of the MMA housing 32. This allows each individual motor insert 91, 93, 95 to be manufactured as a standalone unit which is later installed into the aerodynamic body 32. It also helps to easily replace a motor 41, 43, 45 within the MMA 30, 31 by simply replacing the motor insert 91, 93, 95.

In addition to the motor assemblies 91, 93, 95 providing modularity, the sections of the MMAs 30, 31 can also be modular. As seen in FIGS. 9A-13, the present invention provides several embodiments of the MMA modularity design.

Figure 10:
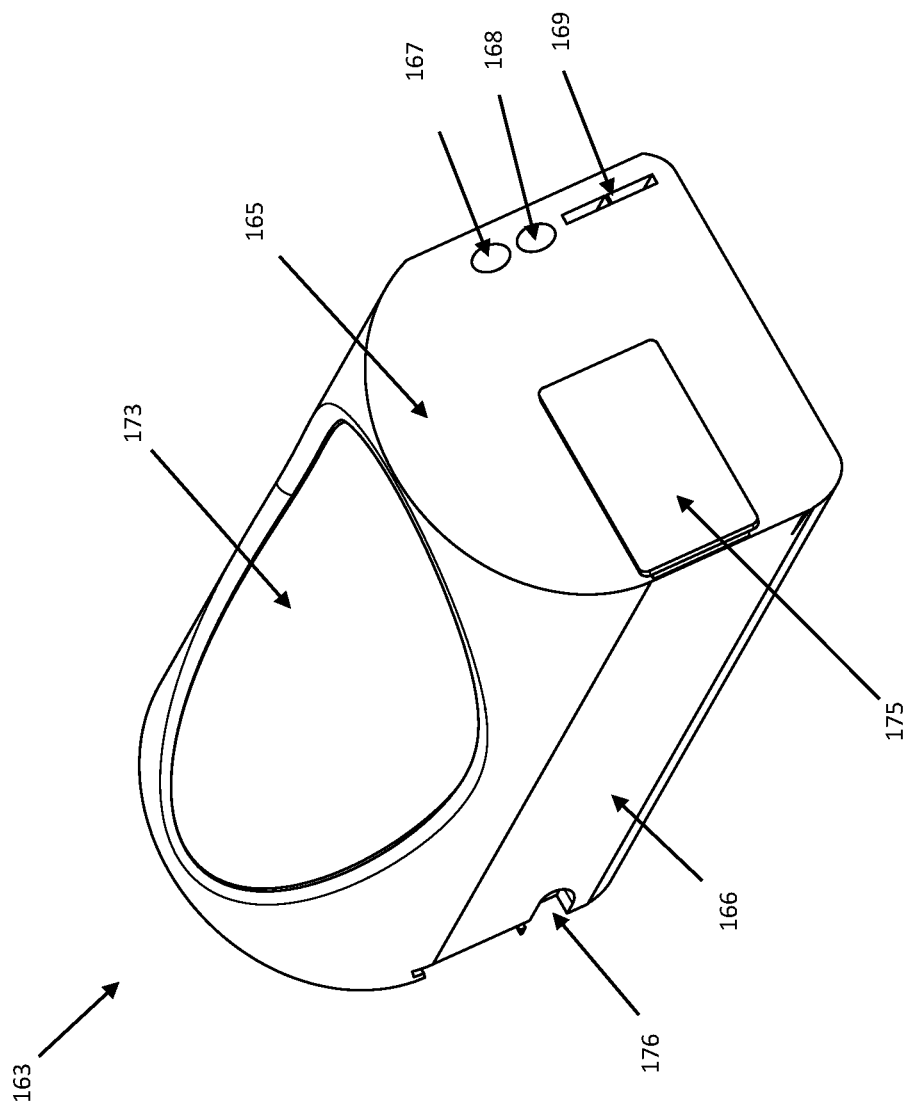
FIG. 10 depicts a perspective view of a middle modular housing for a front motor of the multi-motor assembly insert of the present invention.
Figure 11:
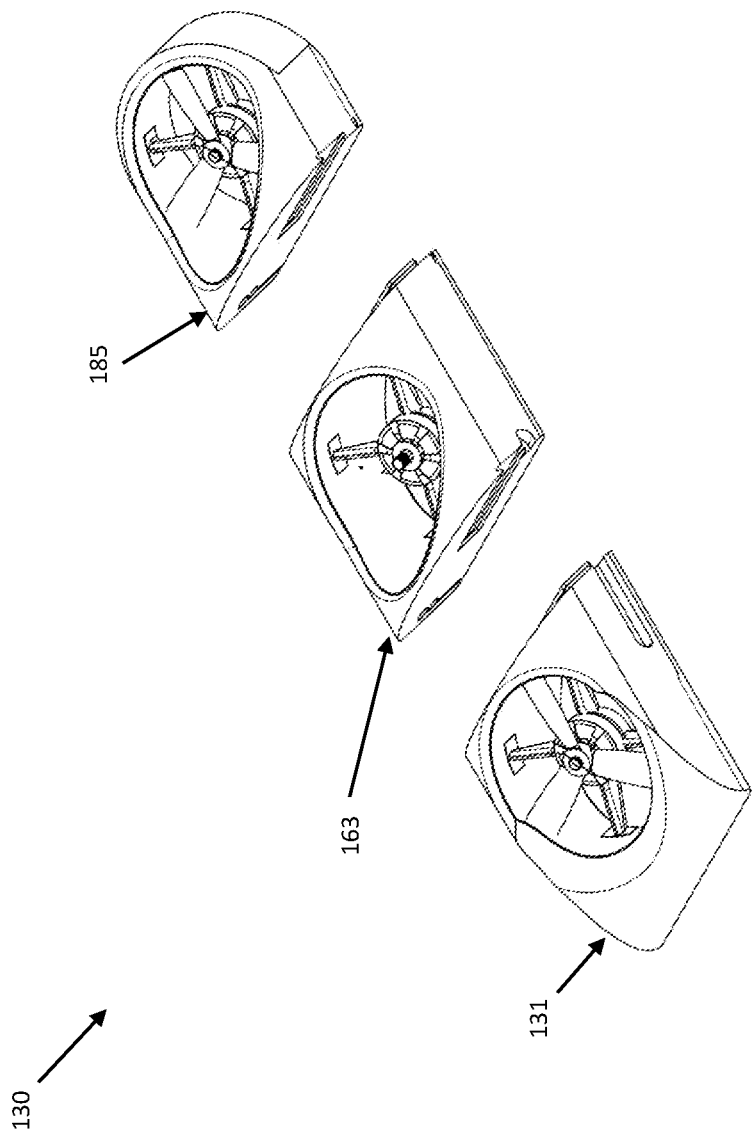
FIG. 11 depicts a perspective exploded view of a first embodiment of a modular multi-motor assembly of the present invention.

FIG. 9A provides a modular design of the Modular MMA front section 131. The front section 131 includes a front housing section 132, a rear wall 135, and a side wall 136 which forms a duct opening 151 with a front insert flange 153. The duct opening 151 and flange 153 are configured to accept a front motor insert 91. The front section 131 also includes a mechanical attachment mechanism 145 which may be a slide protrusion for connecting with a recess on the adjoining MMA section. The front section 131 may include one or more grooves or recesses 146 which form the indicia for proper alignment of the wings or fuselage during assembly. The front section 131 may include power channels formed in the housing shown by intake ports 138, 137 which terminate at the exit ports 147, 148. The power channels are used to wire power to the various sections in the MMAs. Typically, channel 137, 147 would be used for ground wires and power channel 138, 148 would be used for power. The channels may be used for running multiple wires from a power source to the motors 41, 43, 45. In addition, the front section 131 may contain control channels 139, 149 for running on or more control lines or wires throughout the MMAs. FIG. 10 provides a view of the middle section 163 of the MMA 30, 31. The middle section 163 has an opening 173 for receiving a middle motor insert 93. The middle section would also include a rear wall 165 with channels 167, 168, 169 and an attachment element 175 for connecting to the front or rear section and a side wall 166 with a groove of indicia 176. Although not shown in in detail, the rear section 185 (see FIG. 11) has similar features including channels, ports, and attachment elements. As seen in FIG. 11, the multi-motor modular assembly 130 includes the front section 131 which is attached to the middle section 163 and the middle section is attached to the rear section 185. Power and control lines would be routed through the channels in each section and then connected to a power supply and control hub (as described below).

Figure 12A:
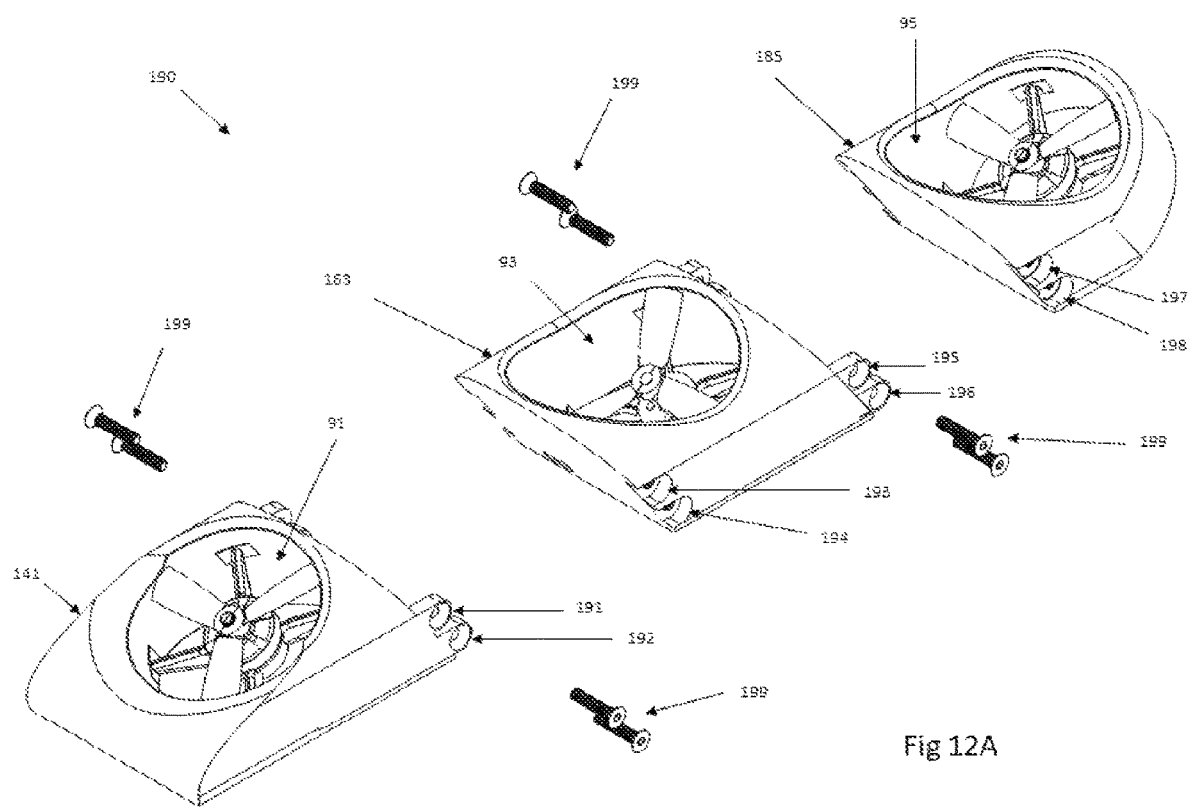
FIG. 12A depicts a perspective exploded view of a second embodiment of a modular multi-motor assembly of the present invention.
Figure 12B:
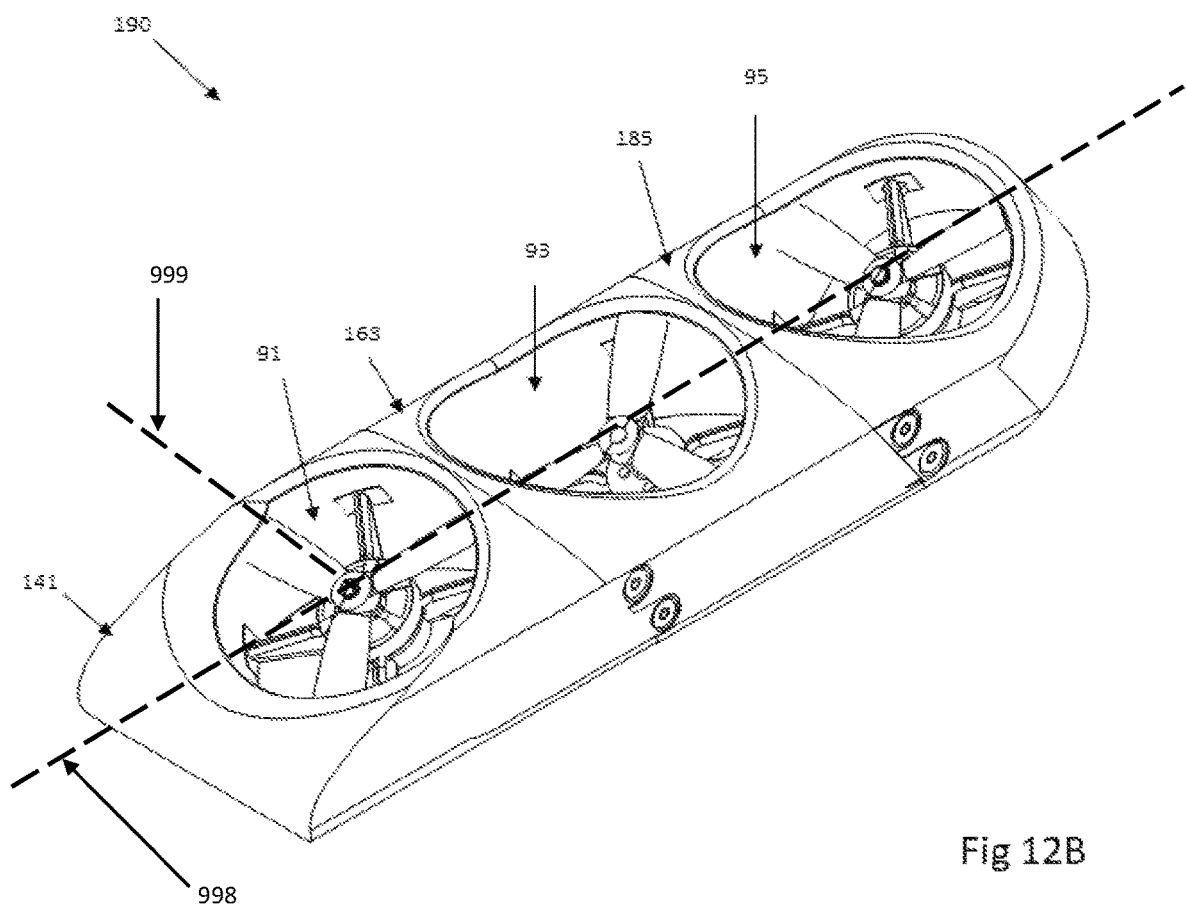
FIG. 12B depicts a perspective view of a second embodiment of a modular multi-motor assembly of the present invention.
Figure 13:
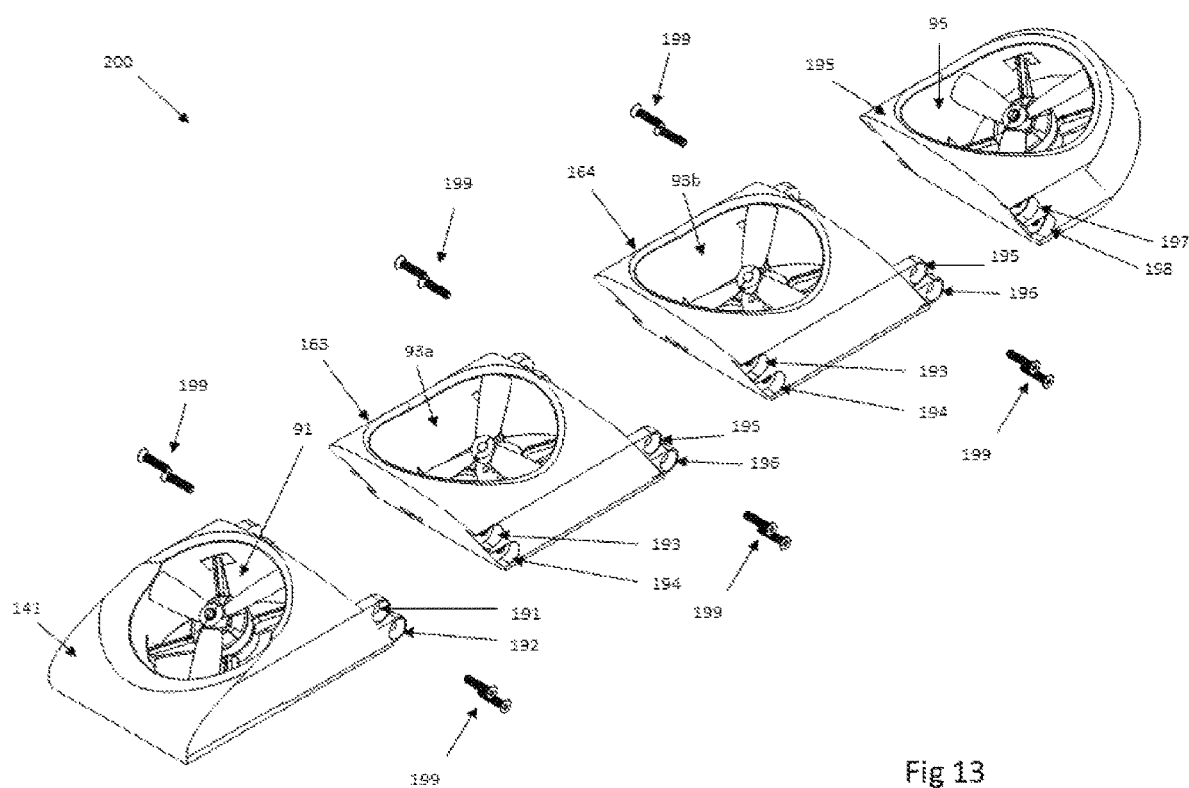
FIG. 13 depicts a perspective exploded view of a modified embodiment of a modular multi-motor assembly of the present invention.
Figure 14:
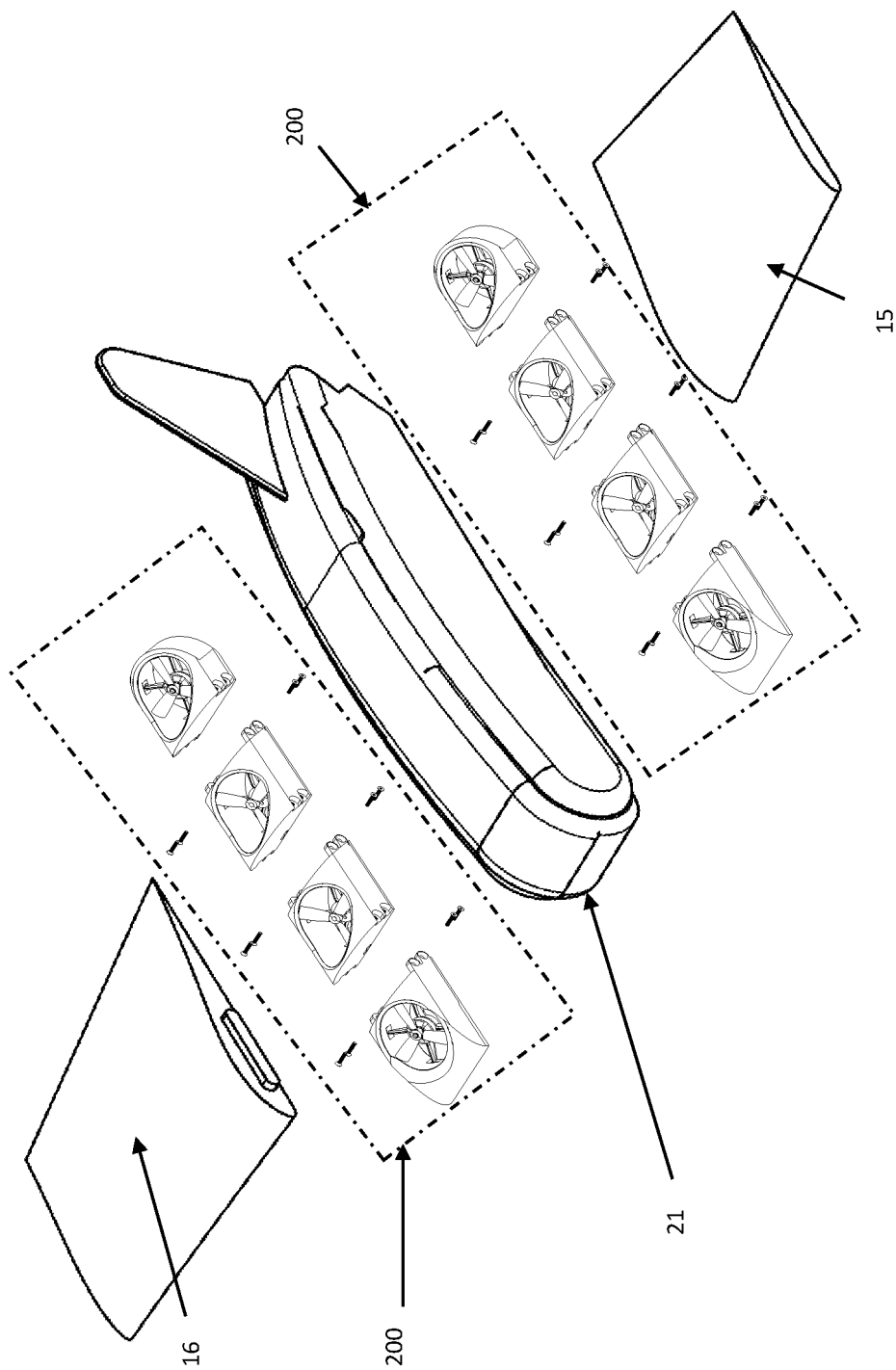
FIG. 14 depicts a perspective exploded view of a modifiable modular embodiment of the aircraft of the present invention.
Figure 16:
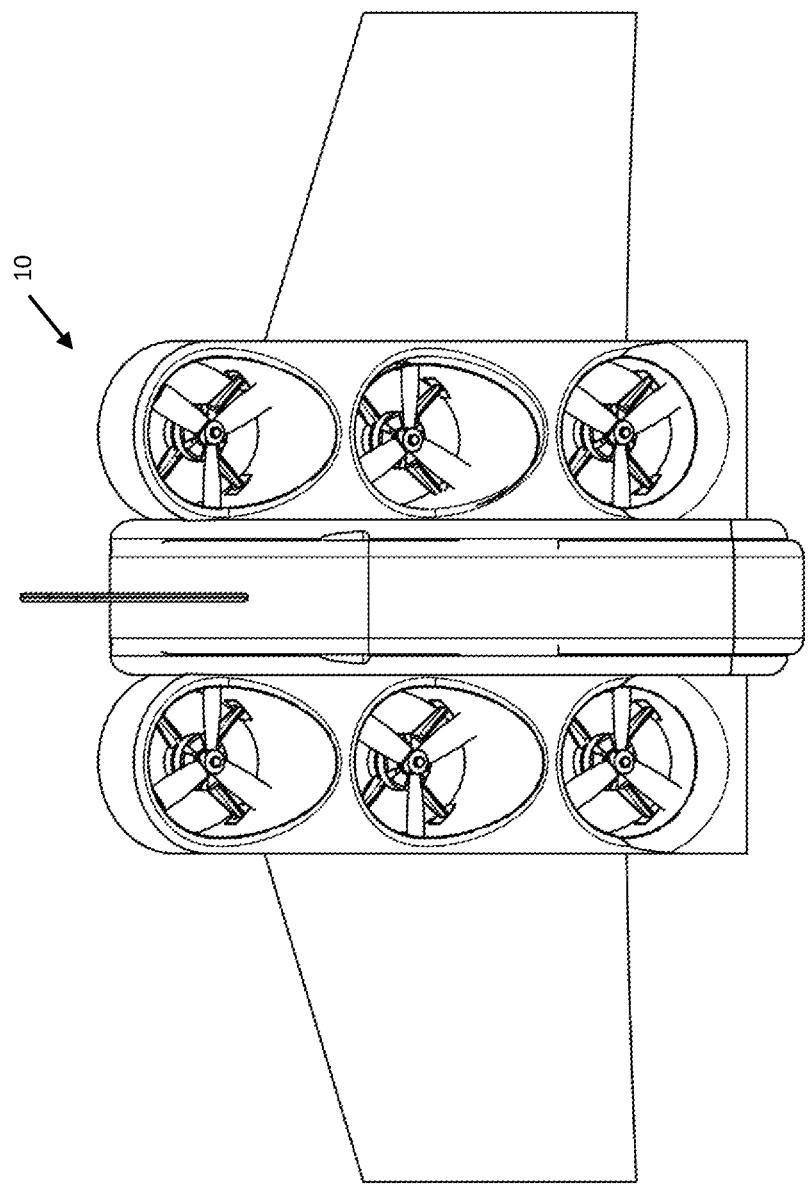
FIG. 16 depicts a top view of a first embodiment of the aircraft of the present invention.

FIGS. 12A and 12B provide an alternative multi-motor modular assembly 190 where the front unit 141, middle unit 163, and rear unit 185 have one or more connecting tabs 191, 192, 195, 196 which mate with recesses 193, 194, 197, 198 and are connected with one or more screws 199. The units 141, 163, 185 would still provide channels or grooves to wire power and control cables and indicia or attachment elements to connect to the wings or fuselage. By making each unit 141, 163, 185 modular it enables the user or owner to quickly replace a unit 141, 163, 185 or to expand the MMA 190. As seen in FIG. 13, the MMA 200 could also be expanded to add additional units 164 to the front unit 141, middle unit 163 and rear unit 195. In such instances, the additional unit 164 would be similar to or the same as a standard middle unit 163. The units 141, 163, 164, 185 may integrate power, ground, and control cable connectors to ease the connection of each unit to the next. As seen in FIG. 14, the MMAs 200 may be created by adding more motors or units in series for larger craft/fuselage which might be necessary for larger payloads. The MMAs 200 would still connect to the fuselage 21 and wings 15, 16.

As seen in FIG. 15A-15C, the fuselage 21 is also configured in various parts including a base 28, a canopy 22 which mates with the base 28 to create a compartment 29. The compartment 29 is used to carry a payload. The compartment 29 may also be used to carry the power element (i.e. battery) and controls (i.e. processor and communication element). The canopy 22 includes a nose section 27 and the vertical stabilizer. As seen in FIG. 15C, the MMAs may be attached to the fuselage base 28 which enables the user to load the payload and then cover the payload with the canopy 22.

The Fuselage 21 houses the payload, energy source, and control hardware of the aircraft 10. The fuselage 21 design is not heavily constrained. In an exemplary embodiment, the fuselage is roughly the size of the aerodynamic MMAs 30, 31 but such is not required. It is recommended the fuselage 21 be streamlined to prevent or minimize aerodynamic drag. The fuselage 21 can either be attached to the aerodynamic duct housing body or have wing or strut in between. The fuselage 21 itself may contain a series a ducts or other arrangement of motors. In the exemplary embodiment, the aircraft design does not contain ducts in the fuselage 21.

Creation and Attachment of Wings or Other Additional Aerodynamic Surfaces:

Wings or other surfaces such as canards, tails or vertical stabilizers can be added to the design. In the basic design two wings mirrored on across the side plane intersecting the origin are attached directly to the aerodynamic duct housing body. The wings provide additional lift up to greater than 1:1 lift to weight ratio, depending on airspeed allowing less power to be used in lift generation for forward flight. A single vertical stabilizer is mounted to the tail end of the fuselage, to help stabilize yaw of the vehicle during forward flight.

Creation of the Control System for the Basic Design

The aircraft is controlled by flight controller consisting of at least a gyroscope, accelerometer. Often the controller includes a compass, Global Positioning Device, and airspeed sensor. The flight controller maintains a vectored heading to the vehicle by manipulating the rotational speed or blade pitch of each individual fan in aircraft. The flight controller implements a control system such as an error based Proportional Integral derivative loop to maintain the stability of the vehicle. The controller accounts for level hover the of the vehicle to be the level flight angle plus the pitch angle of the ducts. This means the aerodynamic duct housing body is pitched up at that specified angle during hover. The controller also maintains level flight at the angle when the bottom the aerodynamic lifting body is level to the horizontal and perpendicular to the airflow or direction of travel. The result is that the vehicle is in a constant state of transition. Stall speed or minimum speed is therefore eliminated from consideration of the control system. The result is an extremely agile and tight turning aircraft.

Extending the Basic Design:

The basic design is one of the simplest versions of the fully functional aircraft design. However, there are several ways looking toward the future, to modify the design. These include adding a modular design component, adding non static or pivoting aerodynamic housing bodies on to the design, or adding additional aircraft control systems to ensure stability during forward flight.

Construction of a Modular Assembly of an Aerodynamic Duct Housing Body in an Extended Design:

The front and rear profile of the body follow the constraints as set by the basic design. However, in this version the Body is split into two individual self-contained parts often on a line offset from the duct walls. Unlike the basic design the extended design separate modules include a motor controller such as an electronic speed controller. The Module has several attachment points on the exterior the module. Along the split line as described above a bulkhead like structure is attached to allow for the attachment of other duct modules in the series. The bulkhead contains wire connectors for at least one set of powerlines as well as a breakout for control wires. This allows a nonfinite number of ducts to be attached in the series. Each duct added to the series should be identical and the control system will compensate for the number of added or subtracted ducts. All other components of the aircraft are attached to the completed aerodynamic body much like the basic version of the design.

In an exemplary embodiment, the present invention provides a modular aircraft which can incorporate a modular design including the use of one or more multi-motor assemblies where the motors are in series within the multi-motor assembly. Still further, the multi-motor assemblies may be configured to include modular motor assemblies or modular sections. Ultimately, the present invention provides an aircraft with the ability to easily assemble or expand the multi-motor assemblies and, in doing so, modify the characteristics of the aircraft. The modularity also enhances the ability to maintain the aircraft by enabling motors or MMA units to easily be replaced.

Additional Embodiments Employing the Multi-Motor Assembly

The aerodynamic bodies or housing containing the MMAs can be attached to the aircraft in a variety of fashions. The MMAs can be attached directly to the fuselage or main body, combined as part of the wing mounted through the spar or other structure, mounted to external structures like tail booms or rods, under the wing or wings, over the wing or wings, to both the wings and control planes, blended into any body or wing or other surface on the aircraft, can be removable or can be permanently attached. The attachment location of the MMAs would apply to all of the embodiments described herein.

Figure 17:
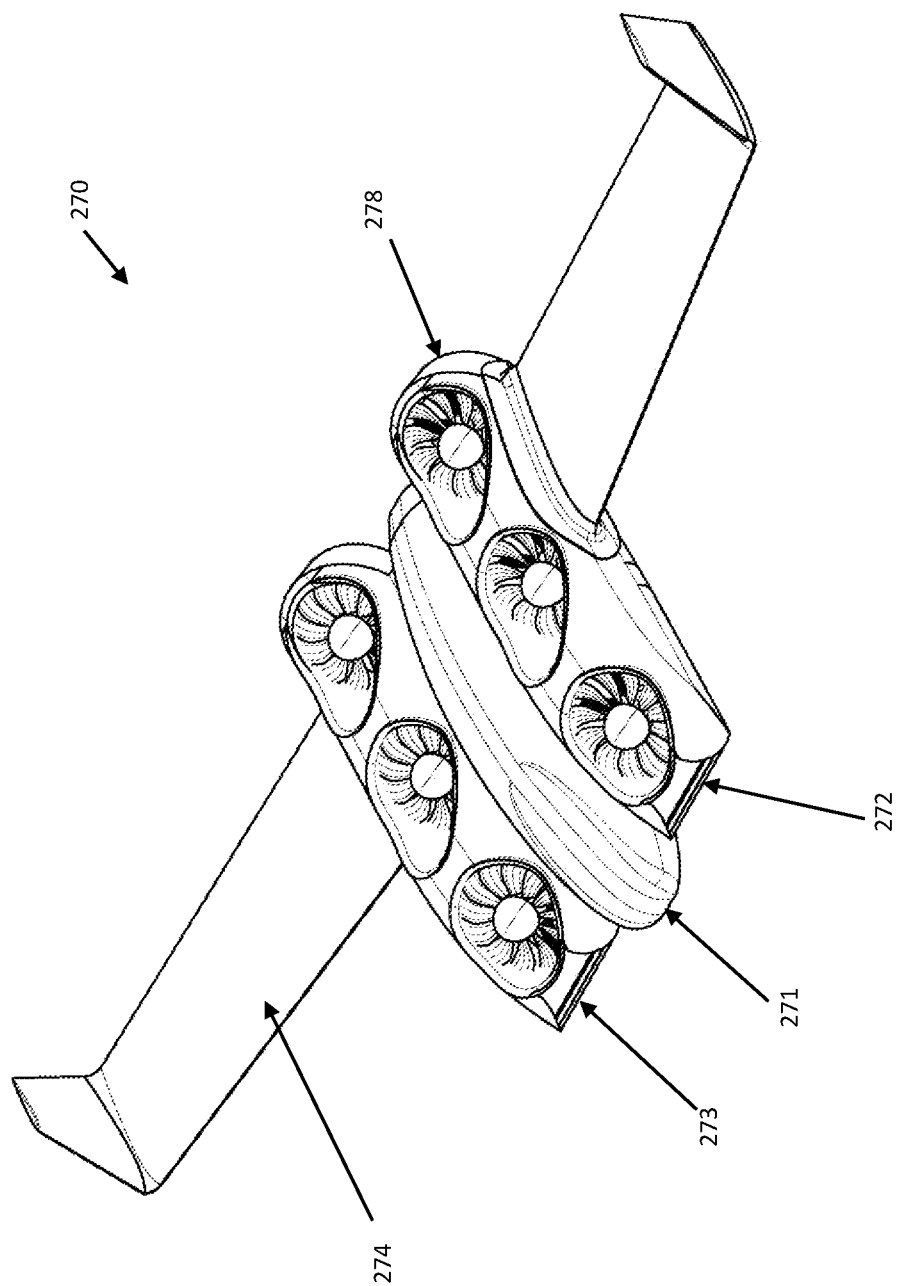
FIG. 17 depicts a perspective view of an additional embodiment of the present invention on an aircraft with no control surfaces.

FIG. 17 shows a perspective view of an additional embodiment of an assembled MMA aircraft 270 with no control surfaces. The assembled aircraft 270 has a center fuselage 271, one or more MMAs 272, 273, and a pair of wings 274 located on opposite sides of the MMAs 272, 273. As previously described, the MMAs 272, 273 are designed to fasten to the fuselage 271. Although not shown, the MMAs 272, 273 may have indicia or alignment keys which mate with corresponding alignment keys on the fuselage 271. Alternatively, the aircraft 270 may be formed as one integrated housing.

The ducted fans of the MMAs 272, 273 are mounted with a central axis 999 of the fan (see FIG. 12B) in a forward angle between 20 and 70 degrees from the horizontal axis 998 (see FIG. 12B) of the MMAs. The ducted fans of the MMAs 272, 273 are contained within the MMA housing such that the fan blades are fully contained in the duct or shroud. The Aerodynamic body of the MMAs 272, 273 is configured so that the rear housing has a cut off portion 278 which ends shortly after the rear or back duct. The MMAs 272, 273 can be adjusted in size such that fans and ducts can be added or removed from the MMAs 272, 273 to increase or decrease the power needed for the size of the aircraft 270. Ideally, the fans and ducts of MMAs 272, 273 are determined or fixed in size based on desired performance and then manufactured with a set immutable number of fans in series. Stators on the ducts can either cancel propeller torques and rotations or amplify the effect to benefit aircraft controllability. In the preferred embodiment, the fans are pitched forward, in the MMAs 272, 273 to a desired angle. In addition to rotating the fans and ducts forward, the ducts can also be rotated relative to the body on the roll axis to increase controllability. Accurate control of the aircraft 270 can be achieved for vertical lift off and forward flight due to multi-motor control of the motors in the MMAs 272, 273. Although this section is described in conjunction with the embodiment depicted in FIG. 17, the aspects of the MMAs 272, 273 would apply to all of the embodiments described herein.

Figure 18:
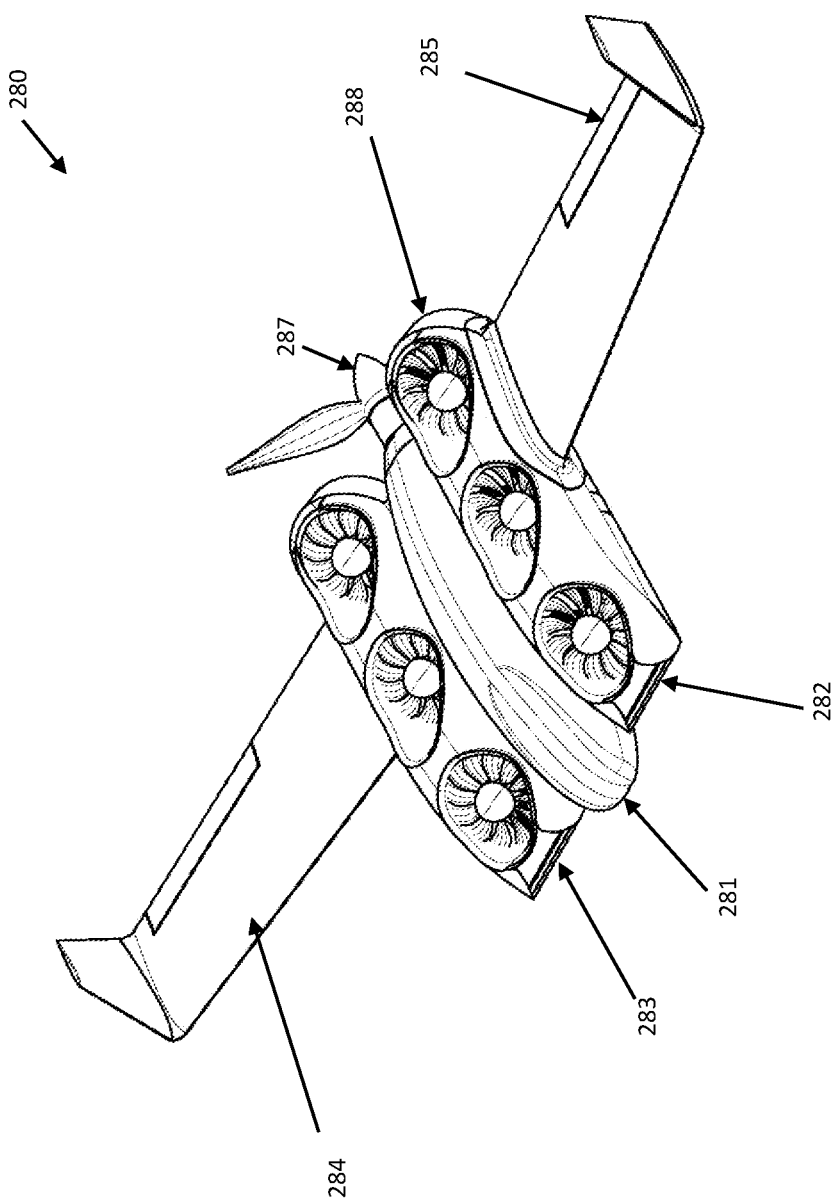
FIG. 18 depicts a perspective view of an additional embodiment of the present invention on an aircraft with elevons and a push propeller.

FIG. 18 shows a perspective view of an additional embodiment of an assembled MMA aircraft 280 with elevons 285 and a push propeller 287. The assembled aircraft 280 has a center fuselage 281, one or more MMAs 282, 283, and a pair of wings 284 located on opposite sides of the MMAs 282, 283. As previously described, the MMAs 282, 283 are designed to fasten to the fuselage 281. Aircraft 280 is similar in design to the aircraft 270 described in FIG. 17 except the elevons 285 provide additional control and the push propeller 287 provide additional power in forward flight. Aircraft 280 would still use the multi-motor control of the MMAs 282, 283 to provide additional control of the aircraft 280 during vertical take off and landing and in forward flight. However, the rear propeller 287 and elevons 285 would provide flexibility in flight control. For example, the MMAs 282, 283 might not be used in forward flight to preserve power for long range flights. Further, the aerodynamic body of the MMAs 282, 283 is configured so that the rear housing has a cut off portion 288 which ends shortly after the rear or back duct. The cut off portion 288 provides the MMAs 282, 283 and aircraft 280 with additional power, control, and efficiency.

Figure 19:
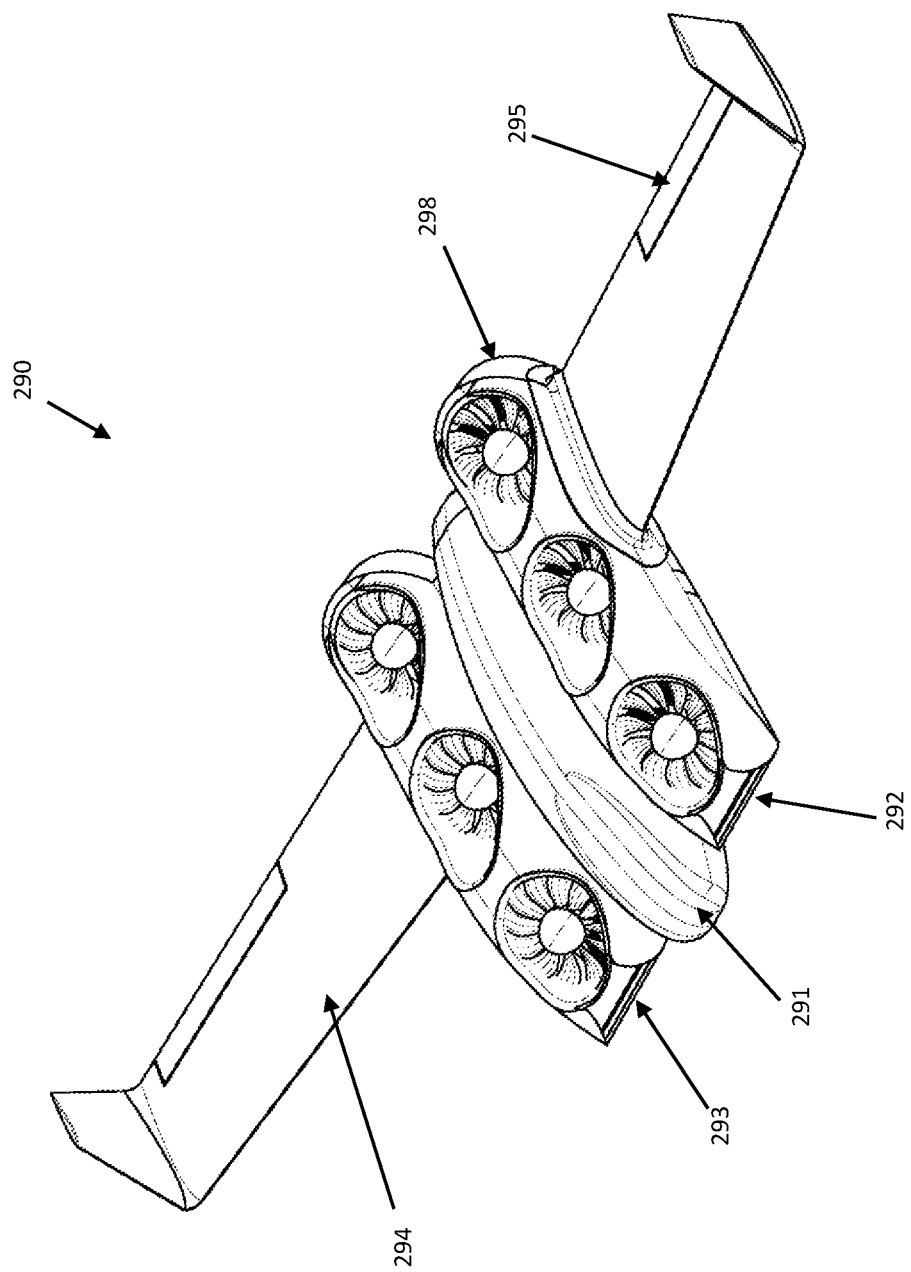
FIG. 19 depicts a perspective view of an additional embodiment of the present invention as part of the fuselage on an aircraft with elevons.

FIG. 19 shows a perspective view of an additional embodiment of an assembled MMA aircraft 290 with elevons 295. The assembled aircraft 290 has a center fuselage 291, one or more MMAs 292, 293, and a pair of wings 294 located on opposite sides of the MMAs 292, 293. As previously described, the MMAs 292, 293 are designed to fasten to the fuselage 291 and to the wings 294. Aircraft 290 is similar in design to the aircraft 270 described in FIG. 17 except the elevons 295 provide additional control. Aircraft 290 could still use the multi-motor control of the MMAs 292, 293 to provide additional control of the aircraft 290 during vertical takeoff and landing and in forward flight. Further, the aerodynamic body of the MMAs 292, 293 is configured so that the rear housing has a cut off portion 298 which ends shortly after the rear or back duct. The cut off portion 298 provides the MMAs 292, 293 and aircraft 290 with additional power, control, and efficiency.

Figure 20:
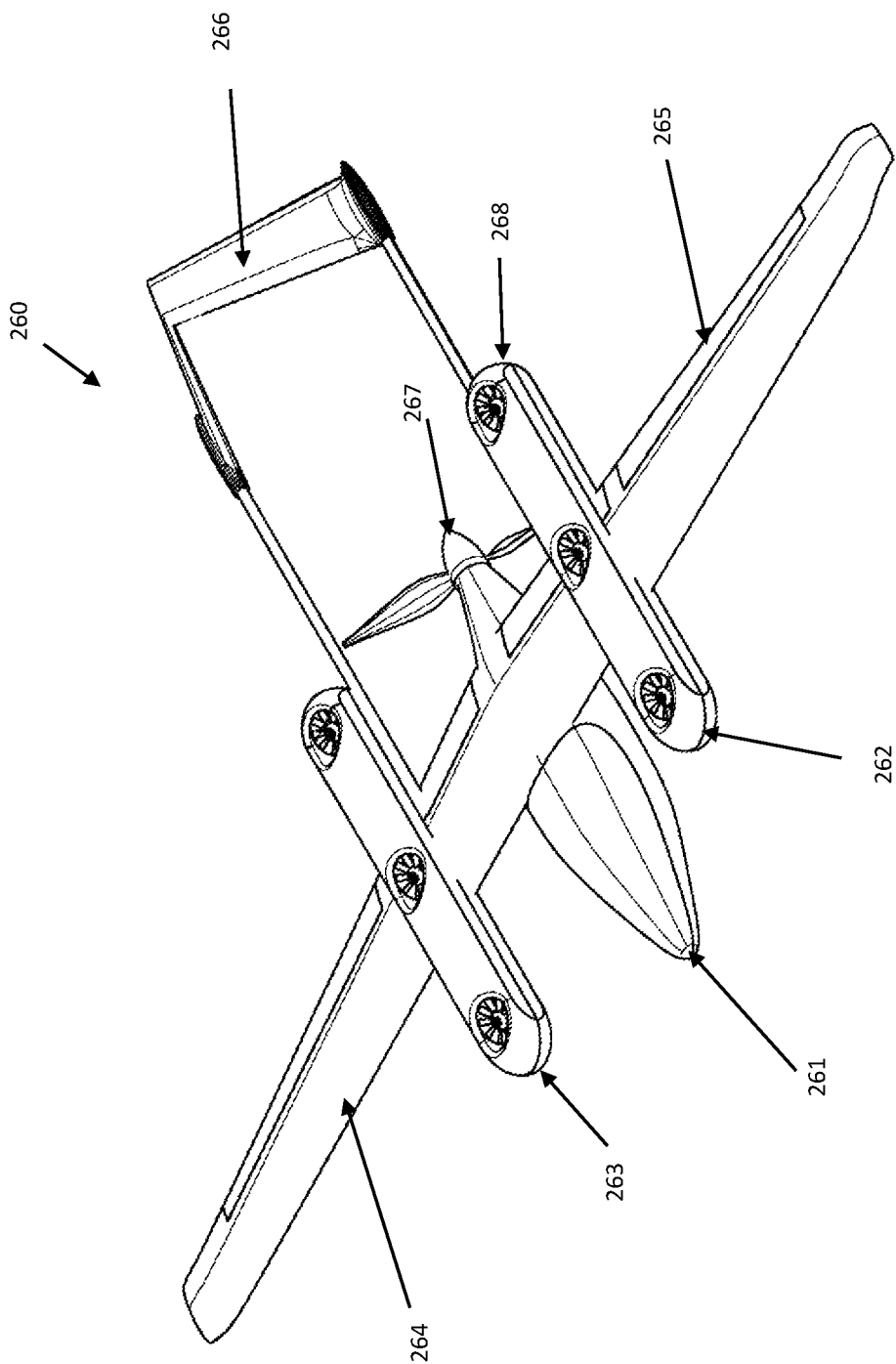
FIG. 20 depicts a perspective view of an additional embodiment of the present invention embedded into the wings of an aircraft with a push propeller and tail.

FIG. 20 shows a perspective view of an additional embodiment of an assembled MMA pod aircraft 260 with push propeller 267, elevons or ailerons 265, and a tail 266. The assembled aircraft 260 has a center fuselage 261, one or more MMAs 262, 263, and a pair of wings 264 located on opposite sides of the MMAs 262, 263. The center fuselage 261 is a pod design which allows a payload to be located inside the pod fuselage 261. Since the Pod aircraft 260 has a rear propeller 267, the MMAs 262, 263 could be distanced from the pod 261 and integrated into the wings 264 along the wingspan at a distance from the pod 261 to provide safe operation of the rear propeller 267. The elevons or ailerons 265 provide additional control and the to the aircraft 260. The tail 266 provide additional lift, stability, and control to the aircraft 260. Aircraft 260 could still use the multi-motor control of the MMAs 262, 263 to provide additional control of the aircraft 260 during vertical takeoff and landing and in forward flight. Further, the aerodynamic body of the MMAs 262, 263 is configured so that the rear housing has a cut off portion 268 which ends shortly after the rear or back duct. The cut off portion 268 provides the MMAs 262, 263 and aircraft 260 with additional power, control, and efficiency.

Figure 21:
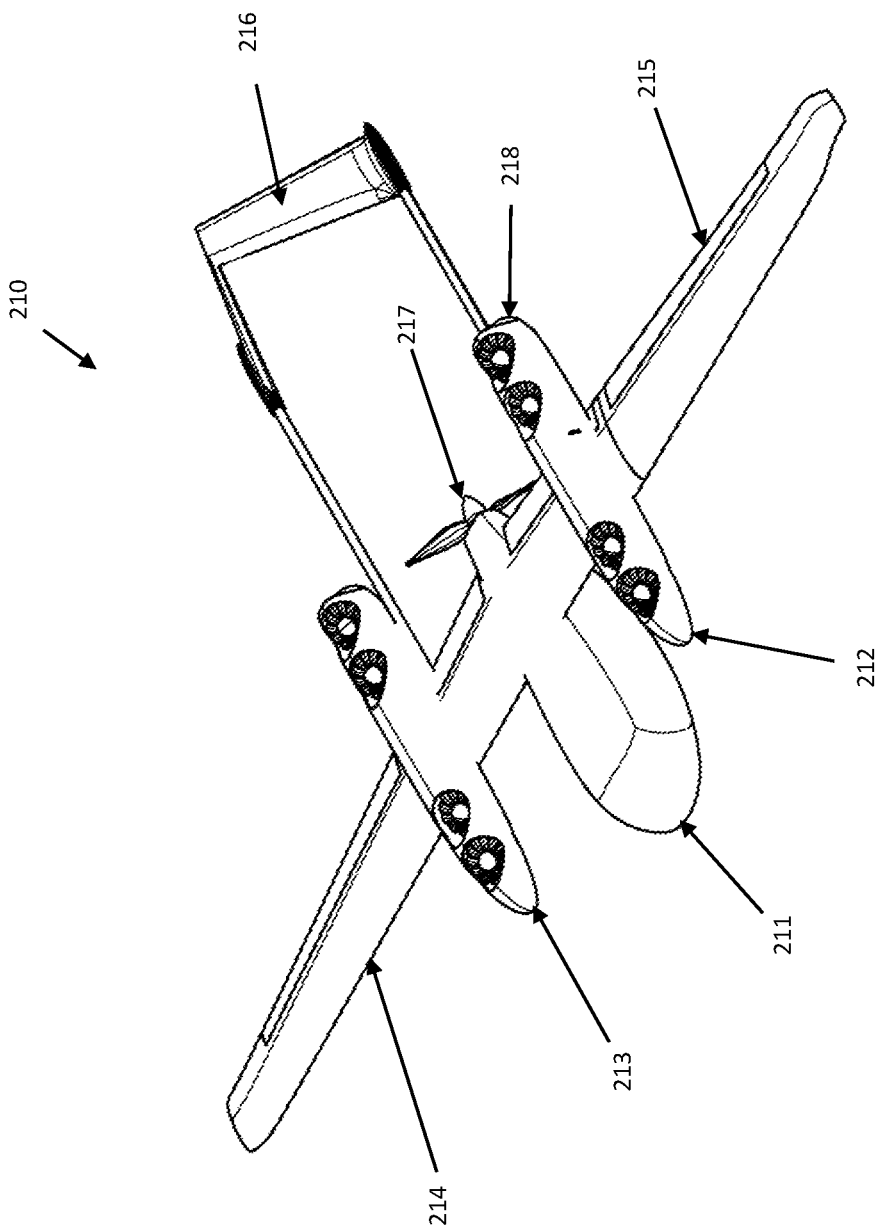
FIG. 21 depicts a perspective view of an additional embodiment of the present invention installed over the wings of an aircraft with a push propeller and tail.

FIG. 21 shows a perspective view of an additional embodiment of an assembled MMA pod aircraft 210 with a push propeller 217, elevons or ailerons 215, and a tail 216. The assembled aircraft 210 has a center fuselage 211, one or more MMAs 212, 213, and a pair of wings 214 located on opposite sides of the MMAs 212, 213. The center fuselage 211 is a pod design which allows a payload to be located inside the pod fuselage 211. Since the Pod aircraft 210 has a rear propeller 217, the MMAs 212, 213 could be distanced from the pod 211. In this exemplary embodiment the MMAs 212, 213 are configured to be mounted over the wing 214 assembly along the wingspan at a distance from the pod 211 to provide safe operation of the rear propeller 217. The elevons or ailerons 215 provide additional control to the aircraft 210. The tail 216 provides additional lift, stability, and control to the aircraft 210. Aircraft 210 could still use the multi-motor control of the MMAs 212, 213 to provide additional control of the aircraft 210 during vertical takeoff and landing and in forward flight. Further, the aerodynamic body of the MMAs 212, 213 is configured so that the rear housing has a cut off portion 218 which ends shortly after the rear or back duct. The cut off portion 218 provides the MMAs 212, 213 and aircraft 210 with additional power, control, and efficiency.

Figure 22:
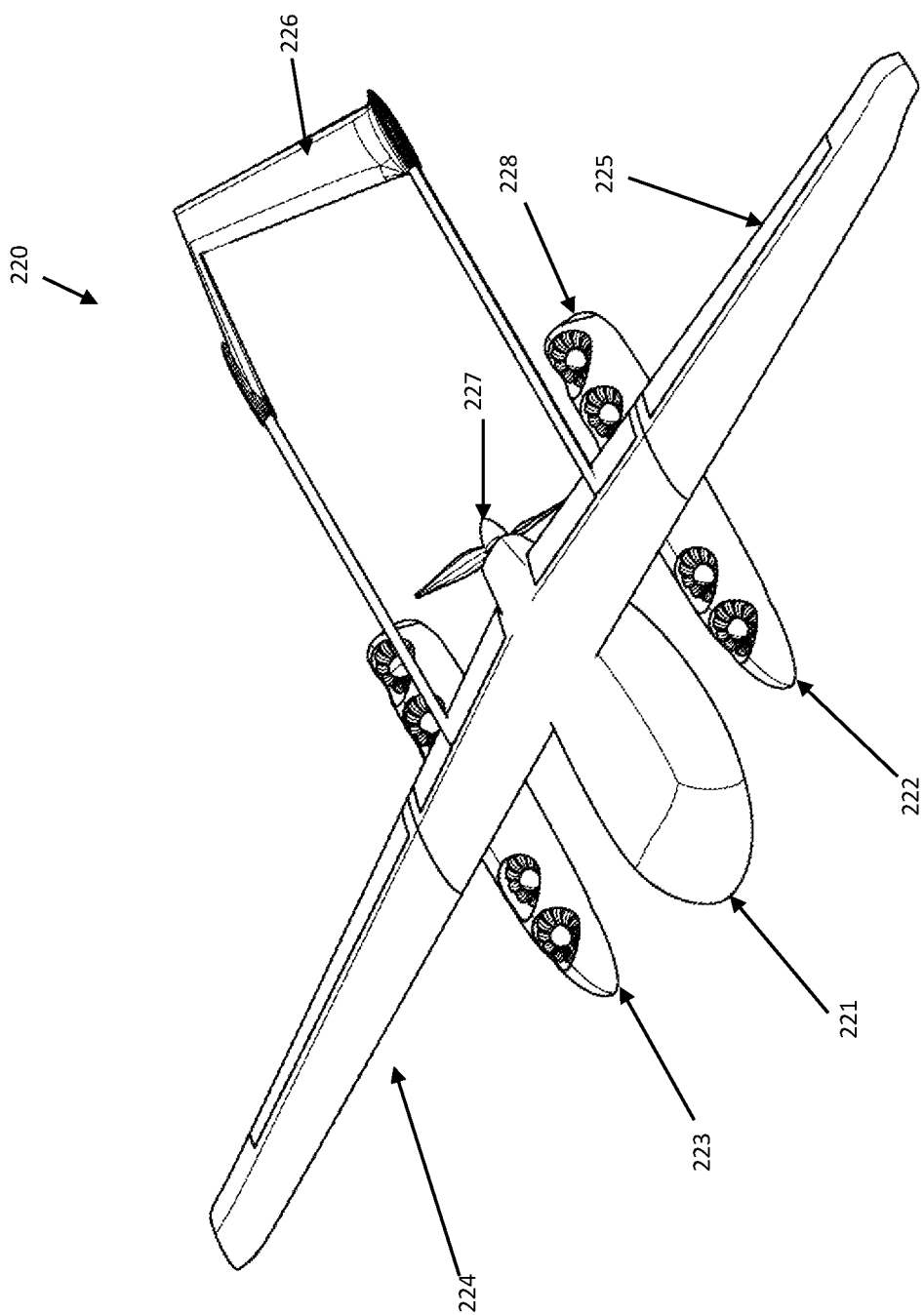
FIG. 22 depicts a perspective view of an additional embodiment of the present invention installed under the wings of an aircraft with a push propeller and tail.

FIG. 22 shows a perspective view of an additional embodiment of an assembled MMA pod aircraft 220 with a push propeller 227, elevons or ailerons 225, and a tail 226. The assembled aircraft 220 has a center fuselage 221, one or more MMAs 222, 223, and a pair of wings 224 located on opposite sides of the MMAs 222, 223. The center fuselage 221 is a pod design which allows a payload to be located inside the pod fuselage 221. Since the Pod aircraft 220 has a rear propeller 227, the MMAs 222, 223 could be distanced from the pod 221. In this exemplary embodiment the MMAs 222, 223 are configured to be mounted under the wing 224 assembly along the wingspan at a distance from the pod 221 to provide safe operation of the rear propeller 227. The elevons or ailerons 225 provide additional control to the aircraft 220. The tail 226 provides additional lift, stability, and control to the aircraft 220. Aircraft 220 could still use the multi-motor control of the MMAs 222, 223 to provide additional control of the aircraft 220 during vertical takeoff and landing and in forward flight. Further, the aerodynamic body of the MMAs 222, 223 is configured so that the rear housing has a cut off portion 228 which ends shortly after the rear or back duct. The cut off portion 218 provides the MMAs 222, 223 and aircraft 220 with additional power, control, and efficiency.

Figure 23:
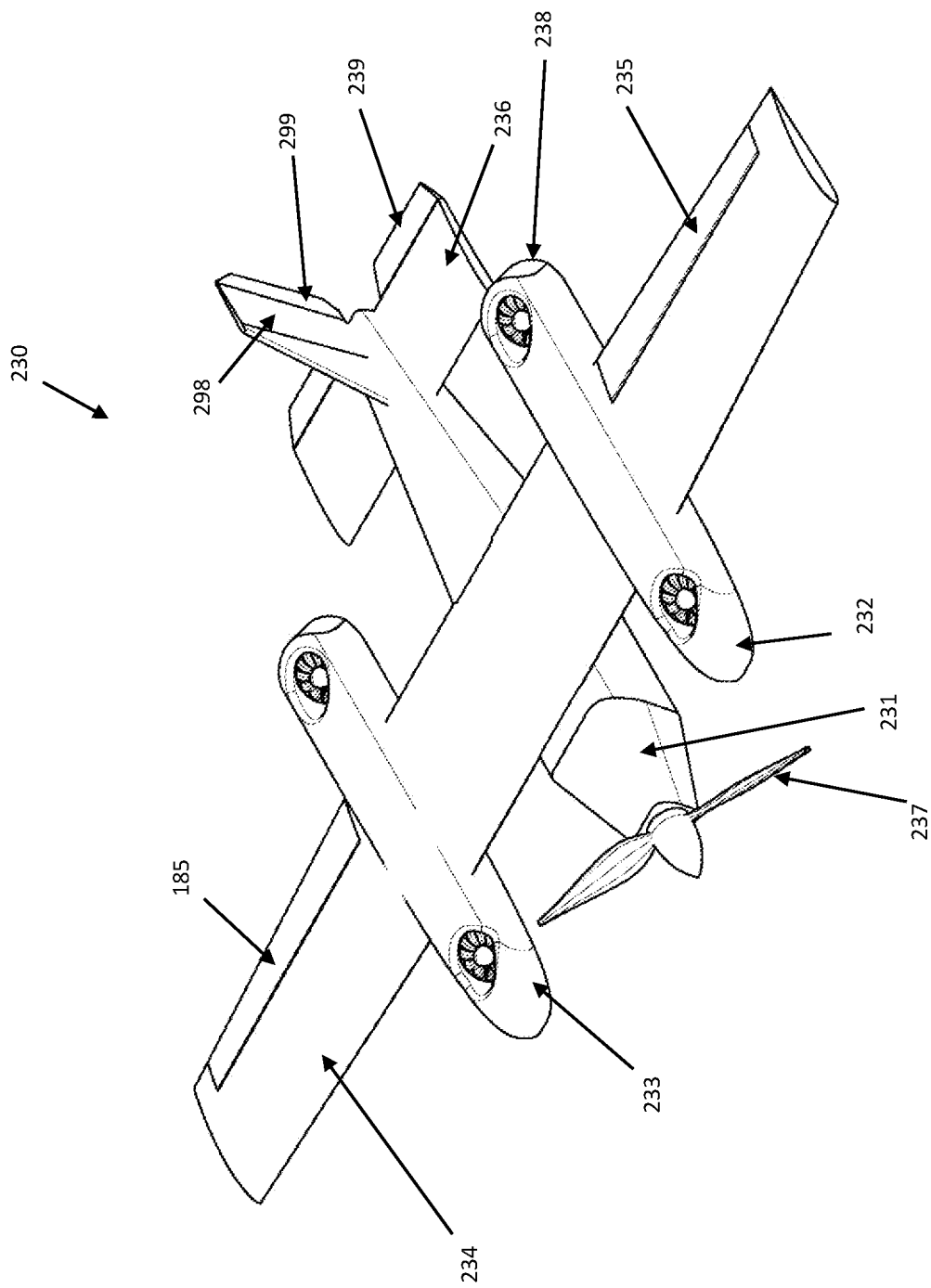
FIG. 23 depicts a perspective view of an additional embodiment of the present invention embedded into the wings of an aircraft with a front propeller and tail.

FIG. 23 shows a perspective view of an additional embodiment of an assembled MMA convention aircraft 230 with a front propeller 237, elevons or ailerons 235, a horizontal tail 236, and a vertical tail 298. The assembled aircraft 230 has a center fuselage 231, one or more MMAs 232, 233, and a pair of wings 234 located on opposite sides of the MMAs 232, 233. The horizontal tail 236 has tail ailerons 239 and the vertical stabilizer 298 which has a rudder 299. The MMAs 232, 233 could be distanced from the pod 231 if needed for clearance from the front propeller 237. In this exemplary embodiment the MMAs 232, 233 are configured to be integrated into the wings 234 along the wingspan. at a distance from the fuselage 231. The elevons or ailerons 235, tail ailerons 239, and rudder 299 provide additional control to the aircraft 230. The tail 236 provides additional lift, stability, and control to the aircraft 230. Aircraft 230 could still use the multi-motor control of the MMAs 232, 233 to provide additional control of the aircraft 230 during vertical takeoff and landing and in forward flight. Further, the aerodynamic body of the MMAs 232, 233 is configured so that the rear housing has a cut off portion 238 which ends shortly after the rear or back duct. The cut off portion 238 provides the MMAs 232, 233 and aircraft 230 with additional power, control, and efficiency.

Figure 24:
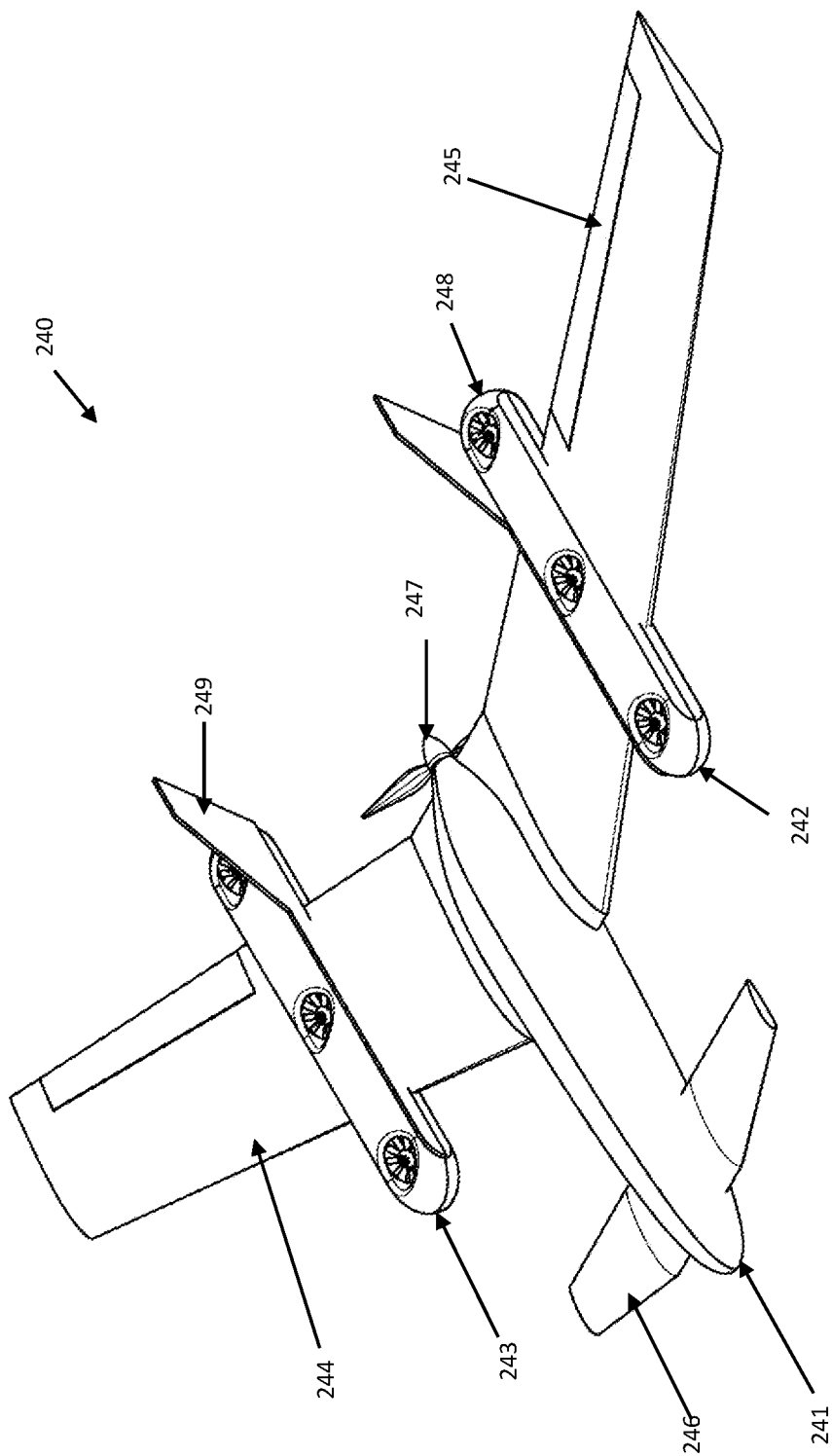
FIG. 24 depicts a perspective view of an additional embodiment of the present invention embedded into the wings of a canard aircraft with a push propeller.

FIG. 24 shows a perspective view of an additional embodiment of an assembled MMA canard style aircraft 240 with a rear propeller 247, elevons 245, a front canard 246, and a pair of rear vertical tails 249. The assembled aircraft 240 has a center fuselage 241, one or more MMAs 242, 243, and a pair of wings 244 located on opposite sides of the fuselage 241. The MMAs 242, 243 could be distanced from the fuselage 241 if needed for clearance from the rear propeller 247. In this exemplary embodiment the MMAs 242, 243 are configured to be integrated into the wings 244 along the wingspan at a distance from the fuselage 241. The canard 246, elevons 245, and a pair of vertical stabilizer tails 249 provide additional lift or control to the aircraft 240. Aircraft 240 could still use the multi-motor control of the MMAs 242, 243 to provide additional control of the aircraft 240 during vertical takeoff and landing and in forward flight. Further, the aerodynamic body of the MMAs 242, 243 is configured so that the rear housing has a cut off portion 248 which ends shortly after the rear or back duct. The cut off portion 248 provides the MMAs 242, 233 and aircraft 240 with additional power, control, and efficiency.

Figure 25:
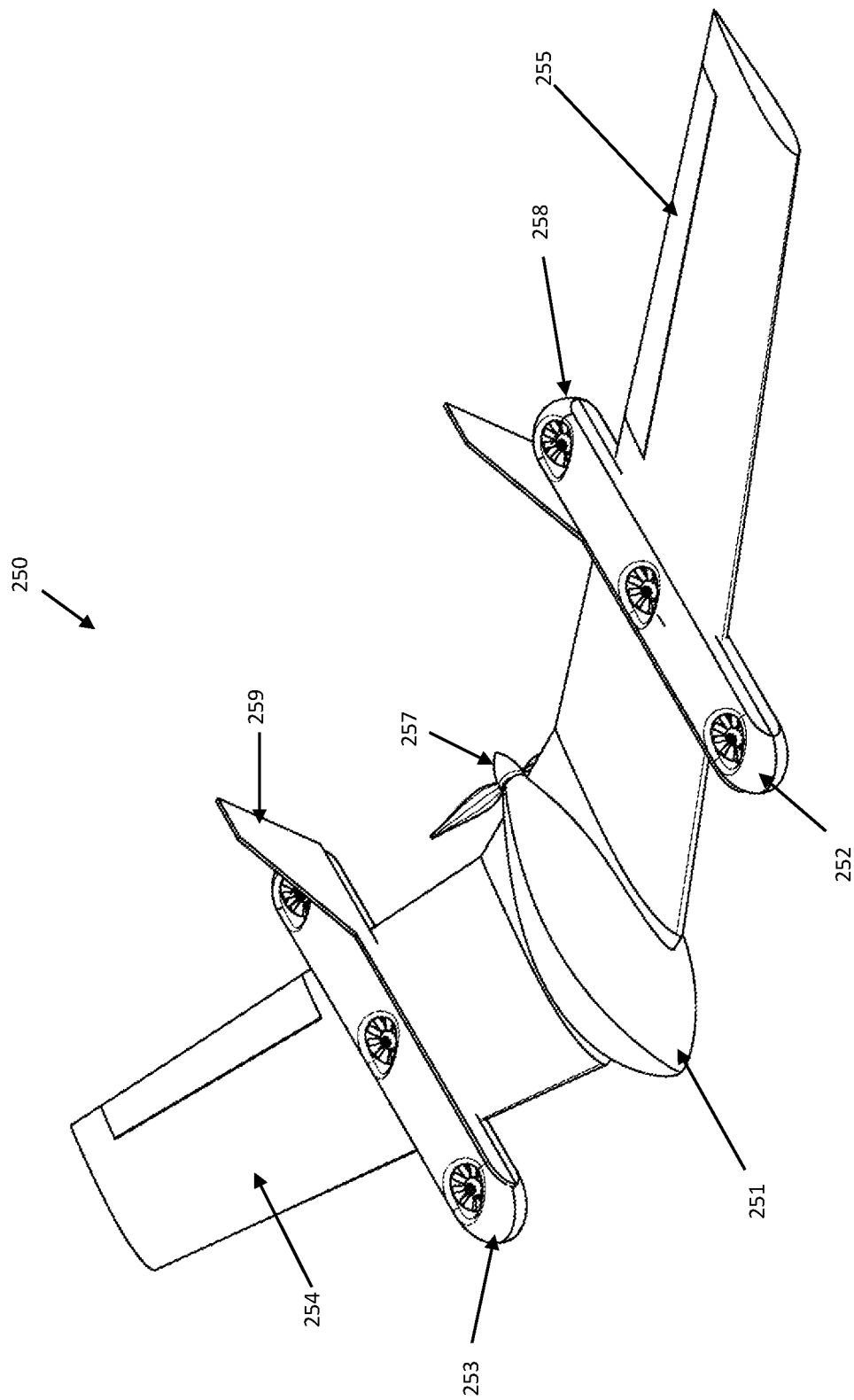
FIG. 25 depicts a perspective view of an additional embodiment of the present invention embedded into the wings of a flying wind aircraft with a push propeller.

FIG. 25 shows a perspective view of an additional embodiment of an assembled MMA flying wing style aircraft 250 with a rear propeller 257, elevons 255, and a pair of rear vertical tails 259. The assembled aircraft 250 is designed as one parge wing having a center wing section 251 and a left and right wing section 254. The one or more MMAs 252, 253 are located on opposite sides of the center wing section 251. The MMAs 252, 253 could be distanced from the center wing section 251 if needed for clearance from the rear propeller 257. In this exemplary embodiment the MMAs 252, 253 are configured to be integrated into the left and right wing section 254 along the wingspan at a distance from the center wing section 251. The elevons 255 and pair of vertical stabilizer tails 259 provide additional control to the aircraft 250. Aircraft 250 could still use the multi-motor control of the MMAs 252, 253 to provide additional control of the aircraft 250 during vertical takeoff and landing and in forward flight. Further, the aerodynamic body of the MMAs 252, 253 is configured so that the rear housing has a cut off portion 258 which ends shortly after the rear or back duct. The cut off portion 258 provides the MMAs 252, 253 and aircraft 250 with additional power, control, and efficiency.

While the foregoing description and drawings represent preferred or exemplary embodiments of the present invention, it will be understood that various additions, modifications and substitutions may be made therein without departing from the spirit and scope and range of equivalents of the accompanying claims. In particular, it will be clear to those skilled in the art that the present invention may be embodied in other forms, structures, arrangements, proportions, sizes, and with other elements, materials, and components, without departing from the spirit or essential characteristics thereof. In addition, numerous variations in the methods/processes as applicable described herein may be made without departing from the spirit of the invention. One skilled in the art will further appreciate that the invention may be used with many modifications of structure, arrangement, proportions, sizes, materials, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims and equivalents thereof, and not limited to the foregoing description or embodiments. Rather, the appended claims should be construed broadly, to include other variants and embodiments of the invention, which may be made by those skilled in the art without departing from the scope and range of equivalents of the invention.

What is claimed is:

1. A multi-motor propulsion engine for an aircraft, comprising:
   a. an enclosure having a longitudinal axis oriented in a direction of travel of the aircraft, the enclosure including a front nose section having an aerodynamic nose, a rear enclosure section having a reduced rear body duct section, a left side wall, and a right side wall;
   b. a plurality of ducts arranged along the longitudinal axis of the enclosure, wherein each of the plurality of ducts is aligned in the enclosure with a central axis at a forward angle relative to the longitudinal axis;
   c. wherein the plurality of ducts has a front duct with a front duct front wall and a front duct rear wall, wherein the front duct front wall is shorter t ha n the front duct rear wall, and a front duct front wall top portion of the front duct front wall is located vertically below a front duct rear wall top portion of the front duct rear wall;
   d. a plurality of fans with each fan fixed in one of the plurality of ducts, wherein each fan is fixed in each duct at an angle in a range of 20-70 from the longitudinal axis of the enclosure; and
   e. wherein each fan of the plurality of fans are configured to generate airflow along the respective central axis of each duct from a top intake of each duct to a bottom exhaust of each duct to provide lift and thrust to the aircraft.

2. A multi-motor propulsion engine for an aircraft, comprising:
   a. an enclosure having a longitudinal axis oriented in a direction of travel of the aircraft, the enclosure including a front nose section having an aerodynamic nose, a rear duct section having a reduced rear body duct section, a left side wall, and a right side wall;
   b. a plurality of ducts arranged along the longitudinal axis of the enclosure, wherein each of the ducts is aligned in the enclosure with a central axis at a forward angle relative to the longitudinal axis;
   wherein the rear duct section has a rear duct rear wall and a rear duct front wall, and the rear duct rear wall is shorter than the rear duct front wall and a rear duct rear wall bottom portion of the rear duct section is located vertically higher than a rear duct front wall bottom portion of the rear duct section; and c. a plurality of fans with each fan fixed in one of the plurality of ducts, wherein each fan of the plurality of fans are configured to generate airflow along the respective central axis of each duct from a top intake of each duct to a bottom exhaust of each duct to provide lift and thrust to the aircraft.

3. The multi-motor propulsion engine for an aircraft as in claim 2, wherein the plurality of ducts has a front duct with a front duct front wall and a front duct rear wall, wherein the front duct front wall is shorter than the front duct rear wall, and a front duct front wall top portion of the front duct front wall is located vertically lower than a front duct rear wall top portion of the front duct rear wall.

4. The multi-motor propulsion engine for an aircraft as in claim 2, wherein the aerodynamic nose is fixed to the front duct front wall.

5. The multi-motor propulsion engine for an aircraft as in claim 2, wherein each fan is fixed in each duct at an angle in a range of 20°-70° from the longitudinal axis of the enclosure.

6. A multi-motor propulsion engine for an aircraft, comprising:

a. an enclosure having a longitudinal axis oriented in a direction of travel of the aircraft, the enclosure including an aerodynamic nose, a rear enclosure section having a reduced rear body section, a left side wall, and a right side wall;

b. a plurality of ducts arranged along the longitudinal axis of the enclosure, wherein each of the ducts is aligned in the enclosure with a central axis at a forward angle relative to the longitudinal axis of the enclosure;

c. a plurality of fans with each fan fixed in one of the plurality of ducts, wherein the plurality of fans are configured to generate airflow along the respective central axis of each duct from a top end of the duct to a bottom end of each duct to provide lift and thrust to the aircraft;

d. wherein the reduced rear body section has a rear duct rear wall and a rear duct front wall and the rear duct rear wall is shorter than the rear duct front wall and a rear duct rear wall bottom portion of the rear duct rear wall is located vertically higher than a rear duct front wall bottom portion of the rear duct front wall;

e. wherein the front duct has a front duct front wall and a front duct rear wall wherein the front duct front wall is shorter than the front duct rear wall and a front duct front wall top portion of the front duct front wall is located vertically lower than a front duct rear wall top portion of the front duct rear wall; and f. wherein the aerodynamic nose is fixed to the front duct front wall.

7. The multi-motor propulsion engine for an aircraft as in claim 6, wherein each fan is fixed in each duct at an angle in a range of 20°-70° from the longitudinal axis of the enclosure.

8. An aircraft comprising:

a. a fuselage having a first longitudinal axis along a direction of travel of the aircraft, the fuselage having a left side and a right side and a left wing on the left side and a right wing on the right side;

b. a first multi-motor propulsion engine and a second multi-motor propulsion engine operably attached to the aircraft with the first multi-motor propulsion engine attached to the left side of the aircraft and the second multi-motor propulsion engine attached to the right side of the aircraft;

c. the first multi-motor propulsion engine and the second multi-motor propulsion engine each having an enclosure having a second longitudinal axis oriented in a direction of travel of the aircraft, each enclosure including an aerodynamic nose, a rear duct section having a reduced rear body duct section, a left side wall, and a right side wall;

d. a plurality of ducts arranged along the second longitudinal axis of each enclosure, wherein each of the ducts is aligned in the enclosure with a central axis at a forward angle relative to the second longitudinal axis;

e. a fan disposed in each of the plurality of ducts, wherein each fan is configured to generate airflow along the respective central axis of each duct from a top end of each duct to a bottom end of each duct to provide lift and thrust to the aircraft; and f. wherein each rear duct section has a rear duct rear wall and a rear duct front wall and the rear duct rear wall is shorter than the rear duct front wall, and a rear duct rear wall bottom portion of the rear duct rear wall is located vertically higher than a rear duct front wall bottom portion of the rear duct front wall.

9. The aircraft as in claim 8, wherein the first multi-motor propulsion engine is connected to the left wing and the second multi-motor propulsion engine is connected to the right wing.

10. The aircraft as in claim 9, wherein the first multi-motor propulsion engine is connected to the left wing over the left wing and the second multi-motor propulsion engine is connected to the right wing over the right wing.

11. The aircraft as in claim 9, wherein the first multi-motor propulsion engine is connected to the left wing under the left wing and the second multi-motor propulsion engine is connected to the right wing under the right wing.

12. The aircraft as in claim 9, wherein the first multi-motor propulsion engine is connected to the left wing along a left wingspan of the left wing and the second multi-motor propulsion engine is connected to the right wing along a right wingspan of the right wing.

* * * * *